(12) United States Patent
Kinoshita

(10) Patent No.: US 10,552,515 B2
(45) Date of Patent: Feb. 4, 2020

(54) INFORMATION PROCESSING TERMINAL AND INFORMATION PROCESSING METHOD CAPABLE OF SUPPLYING A USER WITH INFORMATION USEFUL FOR SELECTING LINK INFORMATION

(71) Applicant: FeliCa Networks, Inc., Tokyo (JP)

(72) Inventor: Keiji Kinoshita, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 202 days.

(21) Appl. No.: 14/912,489

(22) PCT Filed: Jul. 31, 2014

(86) PCT No.: PCT/JP2014/070267
§ 371 (c)(1),
(2) Date: Feb. 17, 2016

(87) PCT Pub. No.: WO2015/033711
PCT Pub. Date: Mar. 12, 2015

(65) Prior Publication Data
US 2016/0210271 A1 Jul. 21, 2016

(30) Foreign Application Priority Data

Sep. 3, 2013 (JP) ................. 2013-182341

(51) Int. Cl.
*G06F 17/22* (2006.01)
*G06F 3/0482* (2013.01)
*G06F 3/0484* (2013.01)

(52) U.S. Cl.
CPC ........ *G06F 17/2235* (2013.01); *G06F 3/0482* (2013.01); *G06F 3/04842* (2013.01)

(58) Field of Classification Search
CPC ............... G06F 3/0482; G06F 17/2235; G06F 3/04842; G06F 13/385; G06F 16/955; G06F 16/9024
See application file for complete search history.

(56) References Cited

U.S. PATENT DOCUMENTS 6,317,141 B1 * 11/2001 Pavley ................ G11B 27/034
715/723
7,200,633 B2 * 4/2007 Sekiguchi ........... H04L 12/1859
455/332

(Continued)

*Primary Examiner* — Maikhanh Nguyen
(74) *Attorney, Agent, or Firm* — Paratus Law Group, PLLC

(57) ABSTRACT

To provide an information processing terminal and information processing method capable of supplying a user with information useful for selecting link information, there is provided an information processing terminal including: a request unit configured to request an information processing device to supply layout information including a plurality of pieces of link information indicating link destinations and correlated with information regarding an object based on acquisition of the information regarding the object from the object; and a display control unit configured to generate a link list image based on the layout information acquired from the information processing device and display the generated link list image on a display screen. The display control unit acquires information from a link destination corresponding to each of the plurality of pieces of link information included in the layout information and controls a display form of the link list image displayed on the display screen based on the acquired information.

18 Claims, 30 Drawing Sheets

(56) References Cited

U.S. PATENT DOCUMENTS

| | | | |
|---|---|---|---|
| 7,699,228 B2* | 4/2010 | Wakasa | G06F 17/30905 235/472.01 |
| 7,946,495 B2* | 5/2011 | Wakasa | G06F 17/30905 235/472.01 |
| 8,150,952 B2* | 4/2012 | Masuda | G06F 9/542 340/540 |
| 8,504,695 B2* | 8/2013 | Hashimoto | G06F 17/30902 709/227 |
| 8,924,851 B2* | 12/2014 | Wichmann | G06F 17/3089 382/276 |
| 8,954,845 B2* | 2/2015 | Misawa | G06F 17/2235 715/256 |
| 9,571,474 B2* | 2/2017 | Trappeniers | G06F 21/34 |
| 9,891,785 B2* | 2/2018 | Lin-Hendel | G06F 3/0482 |
| 2002/0032745 A1* | 3/2002 | Honda | G06F 17/30902 709/217 |
| 2002/0083157 A1* | 6/2002 | Sekiguchi | H04L 12/1859 709/219 |
| 2004/0156620 A1* | 8/2004 | Horie | G11B 19/025 386/243 |
| 2004/0169672 A1* | 9/2004 | Misumi | G06F 17/30905 715/700 |
| 2004/0186820 A1* | 9/2004 | Izume | G06F 16/51 |
| 2005/0086264 A1* | 4/2005 | Masuda | G06F 9/542 |
| 2006/0038003 A1* | 2/2006 | Wakasa | G06F 17/30905 235/375 |
| 2009/0303019 A1* | 12/2009 | Trappeniers | G06F 21/34 340/10.41 |
| 2010/0155466 A1* | 6/2010 | Wakasa | G06F 17/30905 235/375 |
| 2011/0066733 A1* | 3/2011 | Hashimoto | G06F 17/30902 709/227 |
| 2011/0087966 A1* | 4/2011 | Leviathan | G06F 16/9577 715/745 |
| 2011/0252315 A1* | 10/2011 | Misawa | G06F 17/2235 715/256 |
| 2012/0042277 A1* | 2/2012 | Lin-Hendel | G06F 3/0482 715/784 |
| 2013/0036343 A1* | 2/2013 | Singhal | G06F 17/30905 715/205 |

* cited by examiner

FIG.1
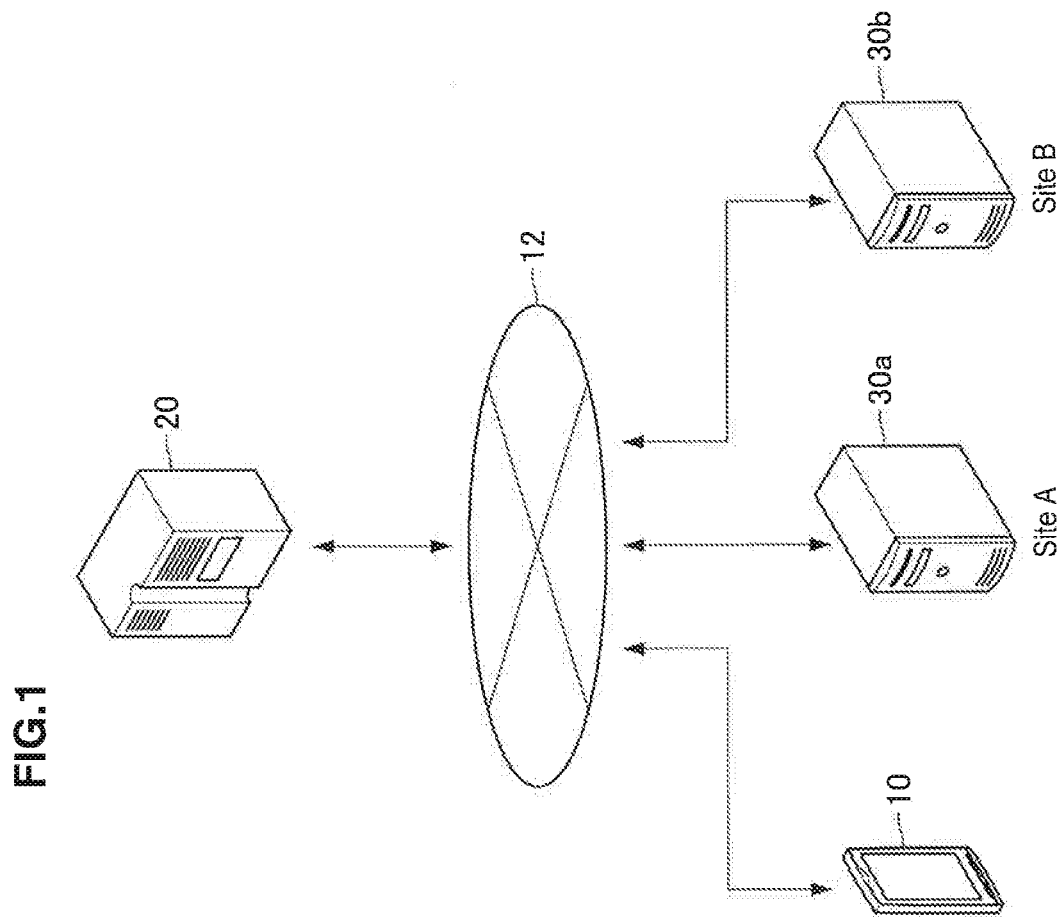
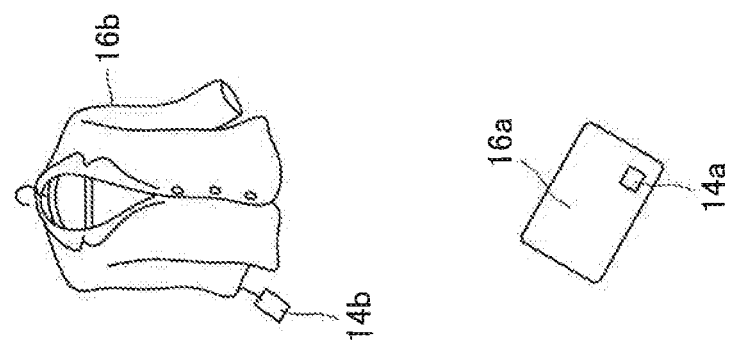

FIG.19

TAG ID TABLE 224

| TAG ID 2240 | LOCATION 2242 | AFFIXED OBJECT 2244 | COLOR 2246 |
|---|---|---|---|
| 1001 | TOKYO AAA | POSTER | BLACK |
| 1002 | NEW YORK BBB | CARD | YELLOW |
| 1003 | BEIJING CCC | CLOTH (PRODUCT) | WHITE |
| 1004 | OSAKA DDD | WALL | RED |
| ... | ... | ... | ... |

FIG.20

LINK INFORMATION TABLE 226

| LINK INFORMATION | TAG ID | TYPE | CATEGORY | TITLE |
|---|---|---|---|---|
| www.AAA.co.jp | 1001 | Web | PARK | JAPAN PARK SOCIETY |
| www.BBB.co.jp | 1001 | Web | TRAFFIC INFORMATION | YOKOHAMA CITY BUS |
| ... | ... | ... | ... | ... |
| C:¥XXX¥··· | 1021 | Web | MAP | MAP APPLICATION |
| C:¥YYY¥··· | 1021 | APPLICATION | WILD BIRD | CAT PRODUCT CATALOG |
| ... | ... | ... | ... | ... |

MANIPULATION HISTORY TABLE 232

| USER ID 2320 | MANIPULATION TIME 2322 | LINK IMAGE 2324 | MANIPULATION CONTENT 2326 |
|---|---|---|---|
| 2001 | 07/01 13:00 | YOKOHAMA CITY BUS | ARRANGEMENT POSITION CHANGED FROM 4TH TO 2ND |
| 2001 | 07/01 18:00 | JAPAN PERFORMANCE SOCIETY | ACQUIRED INFORMATION IS DISPLAYED |
| ... | ... | ... | ... |
| 2051 | 07/02 17:30 | RAILWAY CLUB | STACKING POSITION CHANGED FROM 3RD TO 1ST |
| 2051 | 07/05 14:00 | MAP APPLICATION | APPLICATION IS ACTIVATED |
| ... | ... | ... | ... |

FIG.23

234 SELECTION HISTORY TABLE

| USER ID 2340 | SELECTION TIME 2342 | LINK INFORMATION 2344 |
|---|---|---|
| 2001 | 07/11 10:00 | www.AAA.com |
| 2001 | 07/11 17:00 | www.BBB.co.jp |
| ... | ... | ... |
| 2051 | 07/12 15:30 | www.CCC.com |
| 2051 | 07/15 09:00 | C:¥XXX¥... |
| ... | ... | ... |

FIG.24

READING HISTORY TABLE 236

| USER ID 2360 | READING TIME 2362 | TAG ID 2364 |
|---|---|---|
| 2001 | 08/01 11:30 | 1001 |
| 2001 | 08/01 14:00 | 1021 |
| ... | ... | ... |
| 2051 | 08/05 18:30 | 3050 |
| 2051 | 08/07 21:00 | 5200 |
| ... | ... | ... |

FIG.25

EVALUATION VALUE TABLE 230

| LINK INFORMATION 2300 | USER ID 2302 | EVALUATION VALUE 2304 |
|---|---|---|
| www. AAA.com | 0001 | +1 |
| www. AAA.com | 0002 | 0 |
| ... | ... | ... |
| www. BBB.co.jp | 0001 | -1 |
| www. BBB.co.jp | 0010 | +1 |
| ... | ... | ... |

FIG. 30
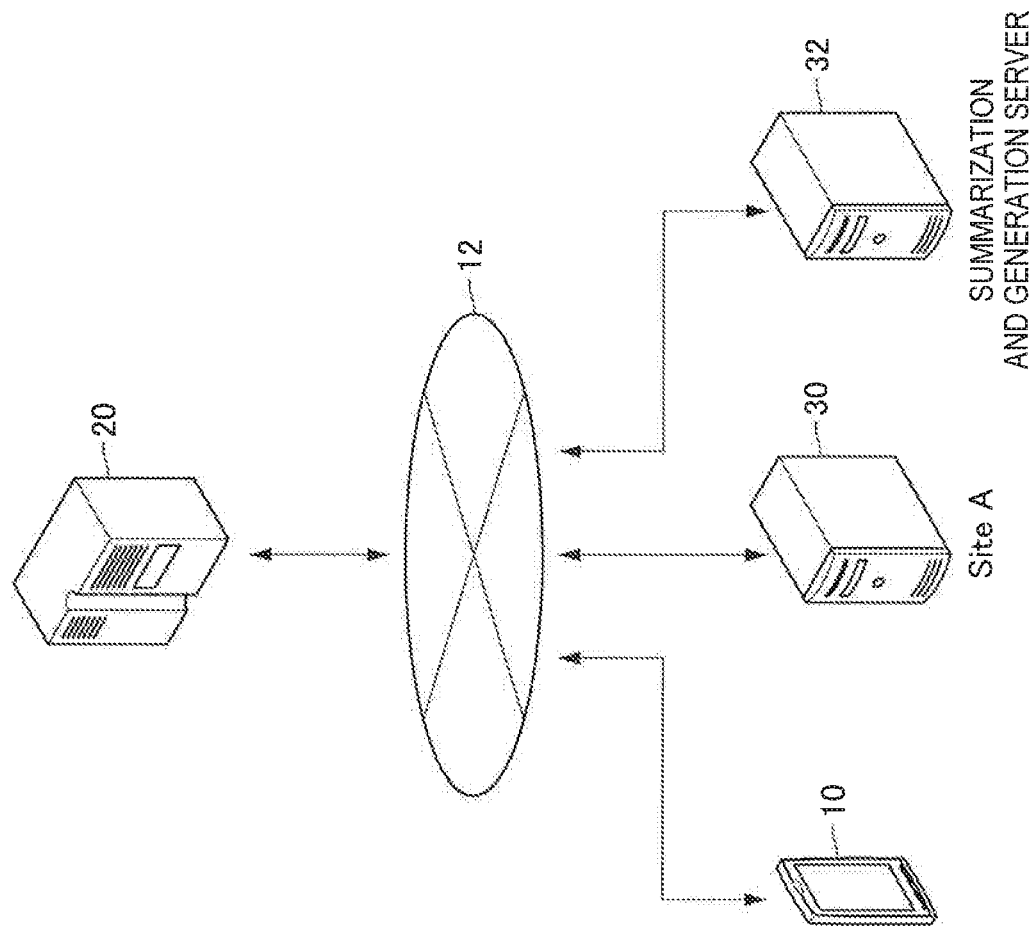
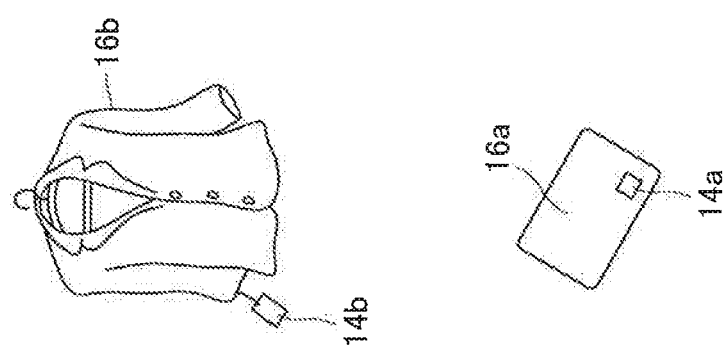

INFORMATION PROCESSING TERMINAL AND INFORMATION PROCESSING METHOD CAPABLE OF SUPPLYING A USER WITH INFORMATION USEFUL FOR SELECTING LINK INFORMATION

CROSS REFERENCE TO PRIOR APPLICATION

This application is a National Stage Patent Application of PCT International Patent Application No. PCT/JP2014/070267 (filed on Jul. 31, 2014) under 35 U.S.C. § 371, which claims priority to Japanese Patent Application No. 2013-182341 (filed on Sep. 3, 2013), which are all hereby incorporated by reference in their entirety.

TECHNICAL FIELD

The present disclosure relates to an information processing terminal and an information processing method.

BACKGROUND ART

In the related art, for example, technologies for reading uniform resource locators (URLs) included in integrated circuit (IC) tags or barcodes with mobile phones or the like and connecting to link destinations corresponding to the read URLs have been widely used.

For example, in the technology disclosed in Patent Literature 1, an IC chip reader and writer (hereinafter also referred to as IC chip R/W) reads identification information regarding an IC chip and transmits the identification information to a server when a user holds over the IC chip mounted on a mobile phone. Then, the server transmits the URL or the like of a communication site associated with an installation place of the IC chip R/W to the mobile phone.

CITATION LIST

Patent Literature

Patent Literature 1: JP 2007-279789A

SUMMARY OF INVENTION

Technical Problem

However, in the technology disclosed in Patent Literature 1, for example, only link information such as a URL or the title of a link destination is transmitted to the mobile phone. For this reason, a user can rarely know information obtained from the link destination indicated by the link information unless the user actually selects the link information in the mobile phone. That is, in the foregoing technology, information useful for selecting the link information may not be provided to users.

It is desirable to provide a novel and improved information processing terminal and a novel and improved information processing method capable of supplying a user with information useful for selecting link information.

Solution to Problem

In order to solve the above problem, according to an aspect of the present disclosure, there is provided an information processing terminal including: a request unit configured to request an information processing device to supply layout information including a plurality of pieces of link information indicating link destinations and correlated with information regarding an object based on acquisition of the information regarding the object from the object; and a display control unit configured to generate a link list image based on the layout information acquired from the information processing device and display the generated link list image on a display screen. The display control unit acquires information from a link destination corresponding to each of the plurality of pieces of link information included in the layout information and controls a display form of the link list image displayed on the display screen based on the acquired information.

In order to solve the above problem, according to another aspect of the present disclosure, there is provided an information processing method including: requesting an information processing device to supply layout information including a plurality of pieces of link information indicating link destinations and correlated with information regarding an object based on acquisition of the information regarding the object from the object; generating, by a processor, a link list image based on the layout information acquired from the information processing device and displaying the generated link list image on a display screen; and acquiring information from a link destination corresponding to each of the plurality of pieces of link information included in the layout information and controlling a display form of the link list image displayed on the display screen based on the acquired information.

In order to solve the above problem, according to another aspect of the present disclosure, there is provided an information processing terminal including: an information acquisition unit configured to acquire information regarding an object from the object; a communication unit configured to communicate with an external device; and a control unit. The control unit requests, via the communication unit, information processing device to supply layout information including a plurality of pieces of link information indicating link destinations and correlated with the information regarding the object acquired by the information acquisition unit, generates a link list image based on the layout information acquired from the information processing device and displays the generated link list image on a display screen, and acquires information from a link destination corresponding to each of the plurality of pieces of link information included in the layout information via the communication unit and controls a display form of the link list image displayed on the display screen based on the acquired information.

In order to solve the above problem, according to another aspect of the present disclosure, there is provided an information processing method including: acquiring information regarding an object from the object; requesting an information processing device to supply layout information including a plurality of pieces of link information indicating link destinations and correlated with the acquired information regarding the object; generating, by a processor, a link list image based on the layout information acquired from the information processing device and displaying the generated link list image on a display screen; and acquiring information from a link destination corresponding to each of the plurality of pieces of link information included in the layout information and controlling a display form of the link list image displayed on the display screen based on the acquired information.

In order to solve the above problem, according to another aspect of the present disclosure, there is provided a program causing a computer to perform: acquiring information regarding an object from the object; requesting an information processing device to supply layout information including a plurality of pieces of link information indicating link destinations and correlated with the acquired information regarding the object; generating, by a processor, a link list image based on the layout information acquired from the information processing device and displaying the generated link list image on a display screen; and acquiring information from a link destination corresponding to each of the plurality of pieces of link information included in the layout information and controlling a display form of the link list image displayed on the display screen based on the acquired information.

In order to solve the above problem, according to another aspect of the present disclosure, there is provided a computer-readable recording medium that records a program causing a computer to perform: acquiring information regarding an object from the object; requesting an information processing device to supply layout information including a plurality of pieces of link information indicating link destinations and correlated with the acquired information regarding the object; generating, by a processor, a link list image based on the layout information acquired from the information processing device and displaying the generated link list image on a display screen; and acquiring information from a link destination corresponding to each of the plurality of pieces of link information included in the layout information and controlling a display form of the link list image displayed on the display screen based on the acquired information.

Advantageous Effects of Invention

According to an embodiment of the present disclosure described above, it is possible to supply a user with the information useful for selecting the link information. The advantageous effects described herein are not necessarily limited, but any advantageous effects described in the present disclosure may be obtained.

BRIEF DESCRIPTION OF DRAWINGS

FIG. 1 is an explanatory diagram illustrating an example of the configuration of an information processing system according to embodiments of the present disclosure.

FIG. 19 is an explanatory diagram illustrating an example of the configuration of a tag ID table according to the embodiment.

FIG. 20 is an explanatory diagram illustrating an example of the configuration of a link information table according to the embodiment.

FIG. 22 is an explanatory diagram illustrating an example of the configuration of a manipulation history table according to the embodiment.

FIG. 23 is an explanatory diagram illustrating an example of the configuration of a selection history table according to the embodiment.

FIG. 24 is an explanatory diagram illustrating an example of the configuration of a reading history table according to the embodiment.

FIG. 25 is an explanatory diagram illustrating an example of the configuration of an evaluation value table according to the embodiment.

FIG. 30 is an explanatory diagram illustrating an example of the configuration of an information processing system according to a modification example of the present disclosure.

DESCRIPTION OF EMBODIMENTS

Figure 2:
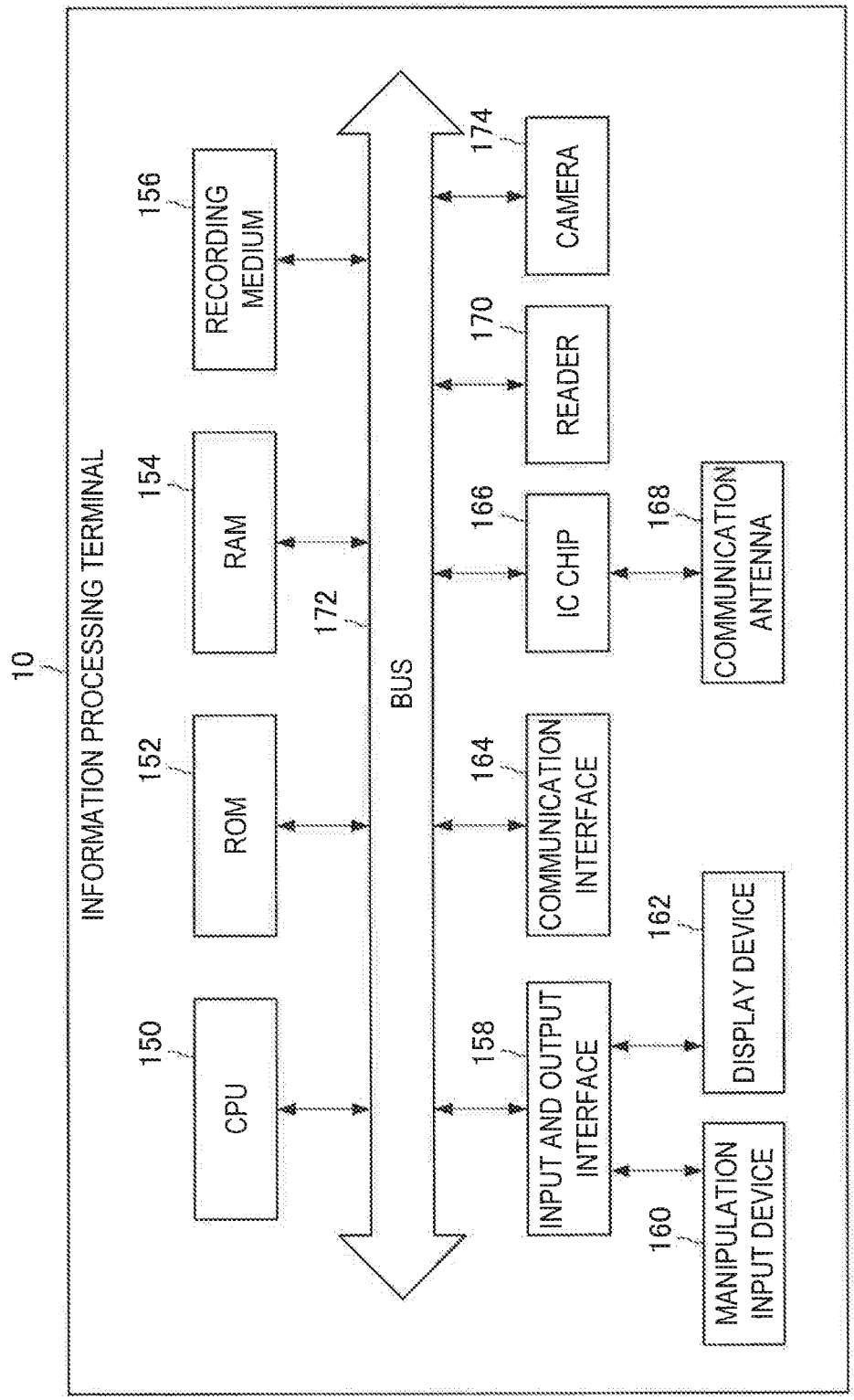
FIG. 2 is an explanatory diagram illustrating a hardware configuration of an information processing terminal 10 according to the embodiments.

Hereinafter, preferred embodiments of the present disclosure will be described in detail with reference to the appended drawings. In this specification and the drawings, elements that have substantially the same function and structure are denoted with the same reference signs, and repeated explanation is omitted.

In the present specification and the drawings, different letters are given after the same reference numerals to distinguish a plurality of constituent elements having substantially the same functional configurations from each other in some cases. For example, a plurality of constituent having substantially the same functional configuration are distinguished from each other as in link servers 30a and 30b, as necessary. However, when it is not necessary to distinguish a plurality of constituent elements having substantially the same functional configuration from each other, only the same reference numeral is given. For example, when it is not necessary to distinguish the link servers 30a and 30h from each other, the link servers 30a and 30b are referred to as the link servers 30.

"Modes for carrying out the present disclosure" will be described in the following order.
1. Basic configuration of information processing system
1-1. Basic configuration
1-2. Comparison example of the present disclosure
2. Overview of the present disclosure
3. Detailed description of each embodiment
3-1. First embodiment
3-2. Second embodiment
4. Modification examples 1. Basic Configuration of Information Processing System 1-1. Basic Configuration The present disclosure can be realized in various forms, as will be described in detail, for example, in "3-1. First embodiment" to "3-2. Second embodiment." Hereinafter, the basic configuration of an information processing system common to the embodiments will be described.

FIG. 1 is an explanatory diagram illustrating an example of the configuration of an information processing system according to embodiments of the present disclosure. As illustrated in FIG. 1, the information processing system according to the embodiments includes an information processing terminal 10, a communication network 12, tags 14, a management server 20, and link servers 30.

(1-1-1. Information Processing Terminal 10)

The information processing terminal 10 is a terminal which can be connected to a communication network 12 to be described below. As will be described in detail, the information processing terminal 10 has a function of requesting the management server 20 to supply layout information including a plurality of pieces of link information. The information processing terminal 10 has a function of displaying a list of the plurality of pieces of link information on a display screen according to the acquired layout information.

The information processing terminal 10 may be, for example, a mobile phone such as a smartphone, a tablet terminal, a personal digital assistant (PDA), a digital still camera, a digital video camera, or a game device.

The information processing terminal 10 has, for example, the hardware configuration illustrated in FIG. 2. FIG. 2 is an explanatory diagram illustrating a hardware configuration of the information processing terminal 10. As illustrated in FIG. 2, the information processing terminal 10 includes, for example, a central processing unit (CPU) 150, a read-only memory (ROM) 152, a random access memory (RAM) 154, a recording medium 156, an input and output interface 158, a manipulation input device 160, a display device 162, a communication interface 164, an IC chip 166, a communication antenna 168, and a camera 174. In the information processing terminal 10, for example, the constituent elements are connected by a bus 172 serving as a data transmission path.

—CPU 150—

The CPU 150 functions as a control unit 100 that controls the entire information processing terminal 10 configured by, for example, various processing circuits and the like. The CPU 150 realizes, for example, functions of a request unit 102, a display control unit 104, an information summarization unit 106, and a transmission control unit 108 to be described below in the information processing terminal 10.

—ROM 152—

The ROM 152 stores programs used by the CPU 150, control data such as calculation parameters, and the like.

—RAM 154—

For example, the RAM 154 temporarily stores programs or the like executed by the CPU 150.

—Recording Medium 156—

The recording medium 156 functions as a storage unit 128 to be described below and stores, for example, setting information and various kinds of data such as applications. Here, examples of the recording medium 156 include a magnetic storage device such as a hard disk and a nonvolatile memory such as a flash memory. The recording medium 156 may be mounted and detached from the information processing terminal 10.

—Input and Output Interface 158—

The input and output interface 158 connects, for example, the manipulation input device 160 or the display device 162. The manipulation input device 160 functions as, for example, an input unit 124 to be described below and the display device 162 functions as, for example, a display unit 122 to be described below Here, examples of the input and output interface 158 include a Universal Serial Bus (USB) terminal, a Digital Visual Interface (DVI) terminal, a High-Definition Multimedia Interface (HDMI: registered trademark) terminal, and various processing circuits. For example, the manipulation input device 160 is provided on the information processing terminal 10 and is connected to the input and output interface 158 inside the information processing terminal 10. Examples of the manipulation input device 160 include a button, a direction key, a rotation type selector such as a jog dial, and a combination thereof. For example, the display device 162 is provided on the information processing terminal 10 and is connected to the input and output interface 158 inside the information processing terminal 10. Examples of the display device 162 include a liquid crystal display and an electro-luminescence (EL) display.

The input and output interface 158 can also be connected to an external device such as a manipulation input device (for example, a keyboard or a mouse) or a display device which is an external device of the information processing terminal 10. The display device 162 may be, for example, a device such as a touch screen on which display and a user manipulation are possible.

—Communication Interface 164—

The communication interface 164 is a communication unit included in the information processing terminal 10 and is used, for example, to perform wireless or wired communication with an external device such as the management server 20 via the communication network 12 (or directly). The communication interface 164 functions as, for example, the communication unit 120 to be described below. Examples of the communication interface 164 include a communication antenna and a radio frequency (RE) circuit (wireless communication), an IEEE802.15.1 port and a transmission and reception circuit (wireless communication), an IEEE802.11b port and a transmission and reception circuit (wireless communication), and a Local Area Network (LAN) terminal and a transmission and reception circuit (wired communication).

—IC chip 166—

The IC chip 166 is a chip in which various functions related to communication performed along a communication path formed by, for example, a Near Field Communication (NFC) are realized in an integrated circuit. Here, for example, the IC chip 166 is connected to the communication antenna 168 configured by a resonant circuit including a coil having predetermined inductance and a capacitor having predetermined electrostatic capacitance as a transmission and reception antenna, and performs communication via the communication antenna 168 along the communication path formed by the NFC. Examples of the circuit in which the IC chip 166 is integrated include a demodulation circuit or a regulator, a load modulation circuit configured to include a load resistor and a switching circuit and selectively perform load modulation, a processing circuit controlling various data processes or load modulation, and a memory element capable of storing data. The IC chip 166 may further include a carrier detection circuit that generates a rectangular detection signal to detect reception of carrier waves.

—Reader 170—

The reader 170 is configured to include, for example, a modulation circuit performing predetermined modulation such as Amplitude Shift Keying (ASK), an amplification circuit amplifying an output of the modulation circuit, and a coil having predetermined inductance. For example, the reader 170 generates a high frequency signal to request an external device to transmit identification information or power reception ability information or generates a high frequency signal including various processing commands or processing data in regard to an external device. The reader 170 transmits carrier waves according to the generated high frequency signal.

—Camera 174—

The camera 174 has a function of causing an image sensor such as a Charge Coupled Device (CCD) or a Complementary Metal Oxide Semiconductor (CMOS) to form an external video through a lens and photographing a still image or a moving image. The camera 174 functions as, for example, a tag reading unit 126 to be described below.

The hardware configuration of the information processing terminal 10 is not limited to the above-described configuration. For example, the information processing terminal 10 may not include the camera 174.

(1-1-2. Communication Network 12)

The communication network 12 is a wireless or wired transmission path of information transmitted from a device connected to the communication network 12. The communication network 12 may include, for example, public line networks such as the Internet, a telephone line network, and a satellite communication network, various Local Area Networks (LANs) including Ethernet (registered trademark), and various Wide Area Networks (WANs). The communication network 12 may include a dedicated line network such as Internet Protocol-Virtual Private Network (IP-VPN).

(1-1-3. Tag 14)

The tag 14 is an example of an object in an embodiment of the present disclosure. The tag 14 has information regarding the tag 14. Here, the information regarding the tag 14 is, for example, a tag ID correlated with the tag 14 and registered in advance. The information regarding the tag 14 may be information indicating the type of tag 14, a category correlated with the tag 14, a location at which the tag 14 is disposed, an object to which the tag 14 is affixed, a color of the tag 14, or the like. The tag ID is an example of object identification information in an embodiment of the present disclosure.

The tag 14 can have, for example, link information such as URL of the management server 20. The tag 14 can also have auxiliary information, such as a service ID, of the link information regarding the management server 20.

In FIG. 1, the example in which the tags 14 are affixed to products 16 such as a card 16a or a cloth 16b is illustrated, but embodiments of the present disclosure are not limited to this example. For example, the tag 14 is disposed in any location of the actual world such as a wall in a building such as a station, a museum, an office building, or an underground passage, a desk or a chair disposed in a building, a product sales corner in a store, or a signboard disposed inside or outside a building.

The object in an embodiment of the present disclosure is not limited to the tag 14. For example, the object in an embodiment of the present disclosure may be a one-dimensional barcode, a two-dimensional barcode, and a predetermined image printed on any of various media such as a sheet. The object in an embodiment of the present disclosure may be a communication device that generates a high frequency signal to correspond to the reader 170 and transmits carrier waves according to the generated signal. The object in an embodiment of the present disclosure may be a communication device that receives a carrier wave transmitted from hardware corresponding to the reader 170. In the present specification, the description will be made below focusing on an example in which an object in an embodiment of the present disclosure is the tag 14 and "information regarding the object" is the tag ID.

(1-1-4. Management Server 20)

The management server 20 is an example of the information processing device according to an embodiment of the present disclosure. The management server 20 is a device that manages a correspondence relation between the tag ID and a plurality of pieces of link information indicating link destinations. Here, the link designation is a site such as a web page managed by the link server 30 to be described below or an application or the like recorded on, for example, the recording medium 156 of the information processing terminal 10.

Figure 3:
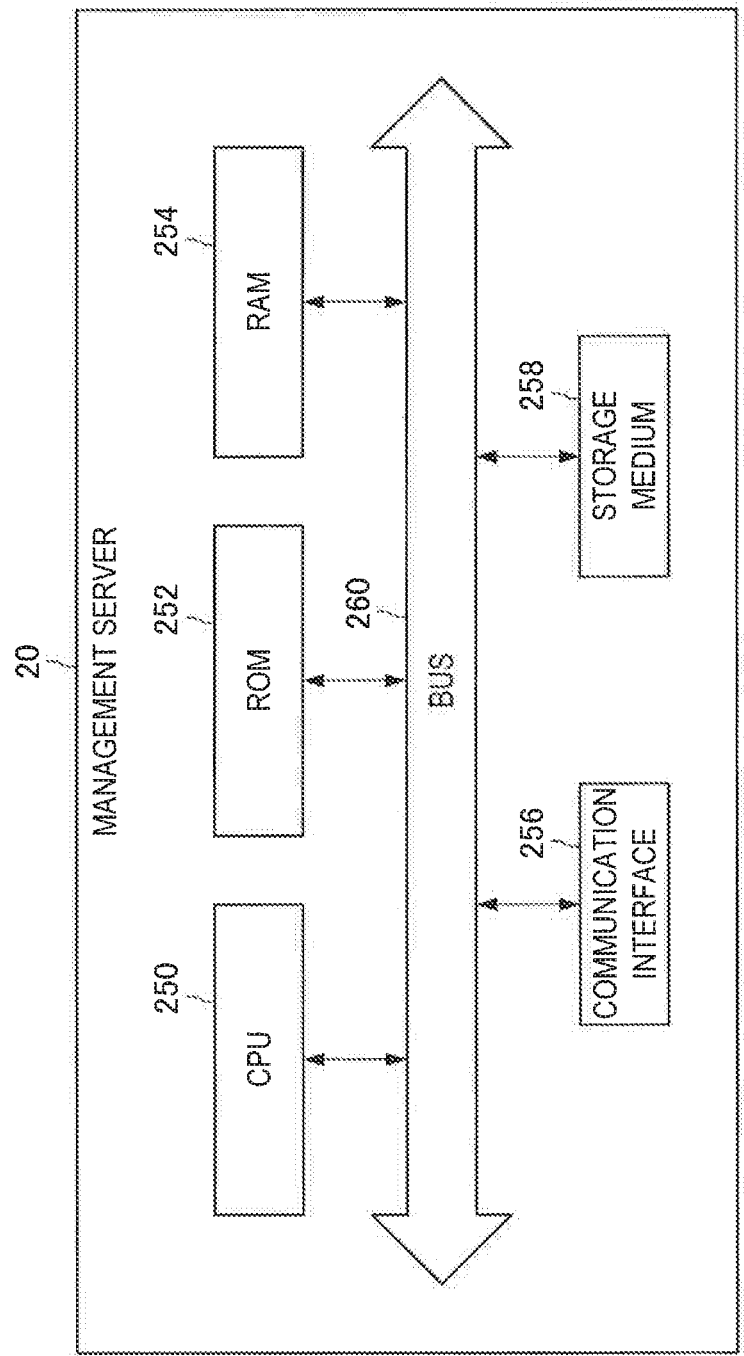
FIG. 3 is an explanatory diagram illustrating a hardware configuration of a management server 20 according to the embodiments.

The management server 20 has, for example, a hardware configuration illustrated in FIG. 3. FIG. 3 is an explanatory diagram illustrating a hardware configuration of the management server 20. As illustrated in FIG. 3, the management server 20 includes, for example, a CPU 250, a ROM 252, a RAM 254, a communication interface 256, and a recording medium 258. In the management server 20, for example, the constituent elements are connected by a bus 260 serving as a data transmission path.

In the management server 20, the CPU 250 realizes, for example, functions of a control unit 200, a link information acquisition unit 202, a layout information generation unit 204, a transmission control unit 206, and a priority decision unit 208 to be described below. The communication interface 256 functions as a communication unit 220 to be described below. The recording medium 258 functions as a storage unit 222 to be described below. The CPU 250, the ROM 252, the RAM 254, the communication interface 256, and the recording medium 258 may have the same hardware configurations as the CPU 150, the ROM 152, the RAM 154, the communication interface 164, and the recording medium 258 of the information processing terminal 10.

(1-1-5. Link Server 30)

As will be described below, the link server 30 is a device that supplies information stored in the link server 30 to the information processing terminal 10 in response to a request form the information processing terminal 10. The link server 30 can have the same hardware configuration as the above-described management server 20.

1-2. Comparison Example of the Present Disclosure

Figure 4:
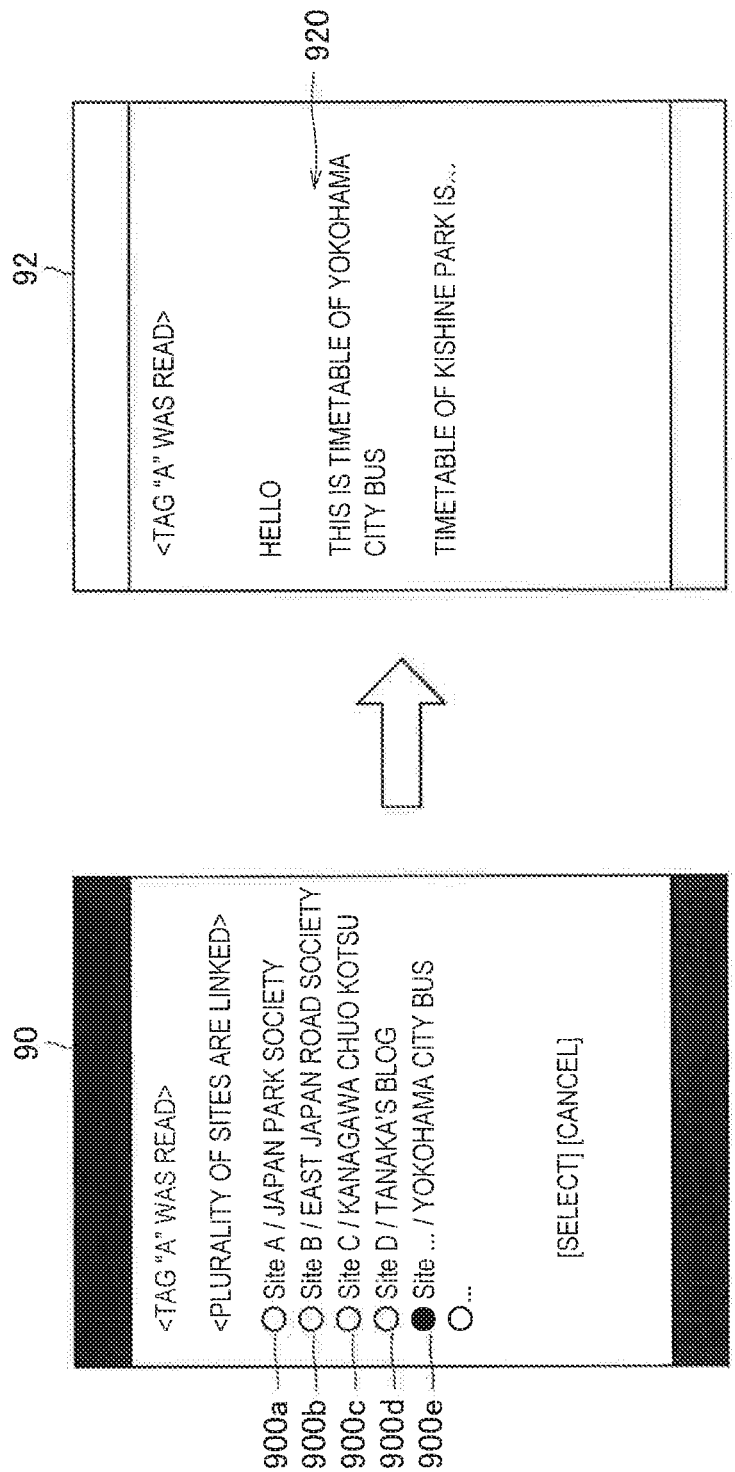
FIG. 4 is an explanatory diagram illustrating examples of the configurations of link list images according to a comparative example of the present disclosure.

Here, a comparative example of an embodiment of the present disclosure will be described to clarify features of an embodiment of the present disclosure. FIG. 4 is an explanatory diagram illustrating an example of the configuration of a link list image 90 according to the comparative example of the present disclosure and an example of the configuration of a link image 92 correlated with one link destination (a link destination with the title "Yokohama City Bus") in the link list image 90. As illustrated in FIG. 4, in the comparative example of the present disclosure, when a user selects one link destination among link destination selection fields 900 in the link list image 90, the link image 92 corresponding to the selected link destination is displayed on a display screen. Accordingly, the user can confirm content of information received from the selected link destination in the link image 92.

In the comparative example of the present disclosure, however, only considerably little information such as the title of each link destination is displayed in the link list image 90. For this reason, it is difficult for the user to select a desired link destination among the plurality of link destinations when the user is not familiar with the link destinations displayed in the link list image 90 and the user may not understand the title names displayed in the link list image 90.

Accordingly; from one viewpoint of the foregoing circumstance, the information processing terminal 10 and the management server 20 according to embodiments of the present disclosure have been created. The information processing terminal 10 according to the embodiments can supply a user with information useful for selecting link information. The management server 20 according to the embodiments can present a plurality of pieces of link information to the user of the information processing terminal 10 for high convenience.

2. Overview of the Present Disclosure

The basic configuration of the information processing system according to the embodiments of the present disclosure has been described above. Next, overviews of embodiments of the above-described information processing system of the present disclosure will be described.

Figure 5:
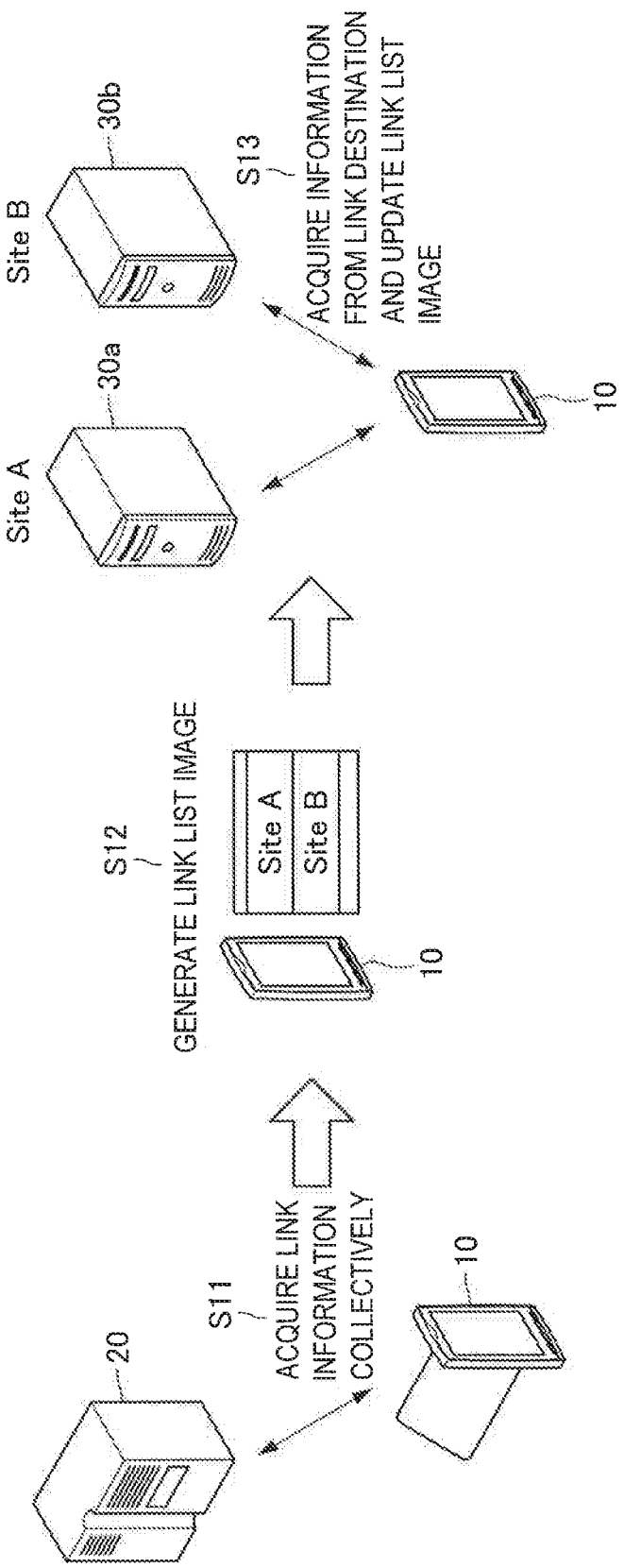
FIG. 5 is an explanatory diagram illustrating an overview of the embodiments of the present disclosure.

FIG. 5 is an explanatory diagram illustrating an overview of an operation according to the embodiments. As illustrated in FIG. 5, in response to a manipulation performed by the user, the information processing terminal 10 first acquires the tag ID from the tag 14 and transmits the acquired tag ID to the management server 20. Next, the management server 20 acquires a plurality of pieces of link information correlated with the tag ID received from the information processing terminal 10 from, for example, the storage unit 222 to be described below and generates layout information including the acquired link information. Then, the management server 20 transmits the generated layout information to the information processing terminal 10 (S11).

Thereafter, the information processing terminal 10 generates link list images based on the layout information received from the management server 20 and displays the generated link list images on a display screen (S12).

Thereafter, the information processing terminal 10 acquires information from link destinations such as the link servers 30 or the like corresponding to the plurality of pieces of link information included in the layout information. Then, the information processing terminal 10 updates display forms of the link list images based on the acquired information (S13).

As described above, the information processing terminal 10 requests the management server 20 to supply the layout information including the plurality of pieces of link information correlated with the tag ID based on the acquisition of the tag ID from the tag 14. Then, the information processing terminal 10 generates the link list images based on the layout information acquired from the management server 20 and displays the generated link list images on the display screen. The information processing terminal 10 acquires the information from the link destinations corresponding to the plurality of pieces of link information included in the layout information and controls the display forms of the link list images based on the acquired information.

Therefore, for example, the information processing terminal 10 adds the information acquired from the link destinations to the link list images to display the information. Therefore, the information processing terminal 10 can supply the user with the information useful for selecting the link information.

The management server 20 acquires the plurality of pieces of link information correlated with the tag ID based on the reception of the tag ID from the information processing terminal 10 and generates the layout information including the acquired plurality of pieces of link information. Then, the management server 20 transmits the generated layout information to the information processing terminal 10.

Therefore, for example, since the management server 20 generates the layout information so that the plurality of pieces of link information are listed and displayed in the information processing terminal 10, it is possible to present the plurality of pieces of link information to the user of the information processing terminal 10 for high convenience.

3. Detailed Description of Embodiments

Hereinafter, embodiments of the present disclosure will be described sequentially in detail.

3-1. First Embodiment 3-1-1. Configuration According to First Embodiment (3-1-1-1. Information Processing Terminal 10)

Figure 6:
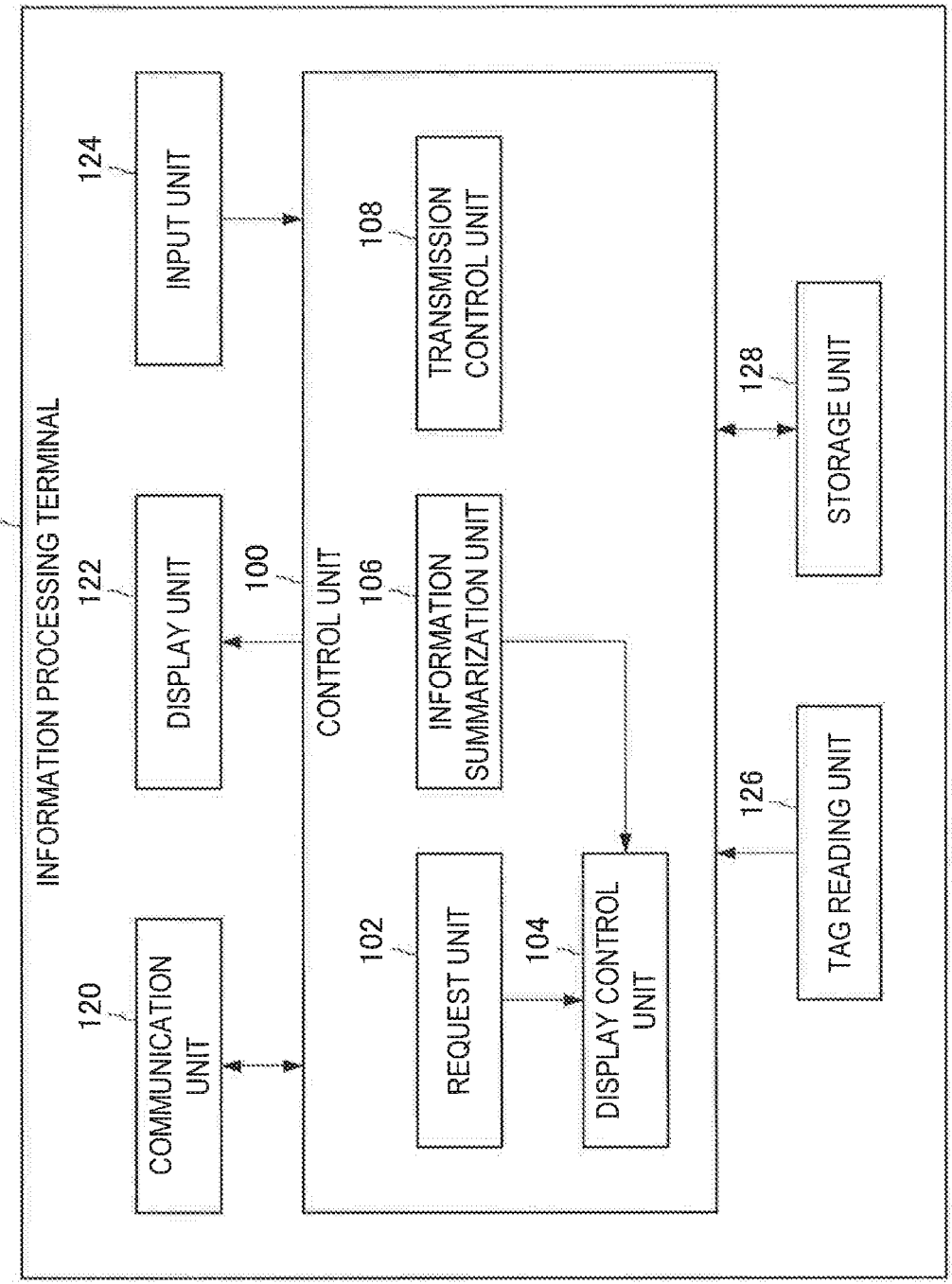
FIG. 6 is a functional block diagram illustrating the configuration of an information processing terminal 10 according to a first embodiment.

FIG. 6 is a functional block diagram illustrating the configuration of the information processing terminal 10 according to a first embodiment of the present disclosure. As illustrated in FIG. 6, the information processing terminal 10 includes the control unit 100, the communication unit 120, the display unit 122, the input unit 124, the tag reading unit 126, and the storage unit 128. The control unit 100 includes a request unit 102, a display control unit 104, an information summarization unit 106, and a transmission control unit 108.

—Control Unit 100—

The control unit 100 performs general control of an operation of the information processing terminal 10 using the hardware of the CPU 150, the RAM 154, and the like included in the information processing terminal 10. For example, the control unit 100 controls operations of the communication unit 120, the display unit 122, the input unit 124, the tag reading unit 126, and the storage unit 128.

—Request Unit 102—

The request unit 102 requests the management server 20 to supply the layout information including the plurality of pieces of link information correlated with the tag ID based on the acquisition of the tag ID by the tag reading unit 126. More specifically, the request unit 102 causes the communication unit 120 to transmit the tag ID read by the tag reading unit 126 to the management server 20 and requests the management server 20 to supply the layout information.

For example, when the tag 14 has the link information such as the URL of the management server 20, the request unit 102 causes the communication unit 120 to transmit the tag ID in the link information regarding the management server 20 read from the tag 14 by the tag reading unit 126 and requests a connection destination, that is, the management server 20, to supply the layout information.

When the tag 14 does not have the link information regarding the management server 20 and the link information regarding the management server 20 is stored in the storage unit 128 to be described below, the request unit 102 causes the communication unit 120 to transmit the tag ID in regard to the link information stored in the storage unit 128 and requests the management server 20 to supply the layout information.

When the plurality of pieces of link information regarding the management server 20 are stored in the storage unit 128, the request unit 102 can select any one piece of information among the plurality of pieces of link information, cause the communication unit 120 to transmit the tag ID in regard to the selected link information, and request supply of the layout information. For example, when the tag 14 has the auxiliary information of the link information such as the service ID, the request unit 102 first selects any one piece of information among the plurality of pieces of link information stored in the storage unit 128 based on the auxiliary information of the link information read by the tag reading unit 126. Then, the request unit 102 causes the communication unit 120 to transmit the tag ID in regard to the selected link information and requests the management server 20 to supply the layout information.

(Layout Information)

Figure 7:
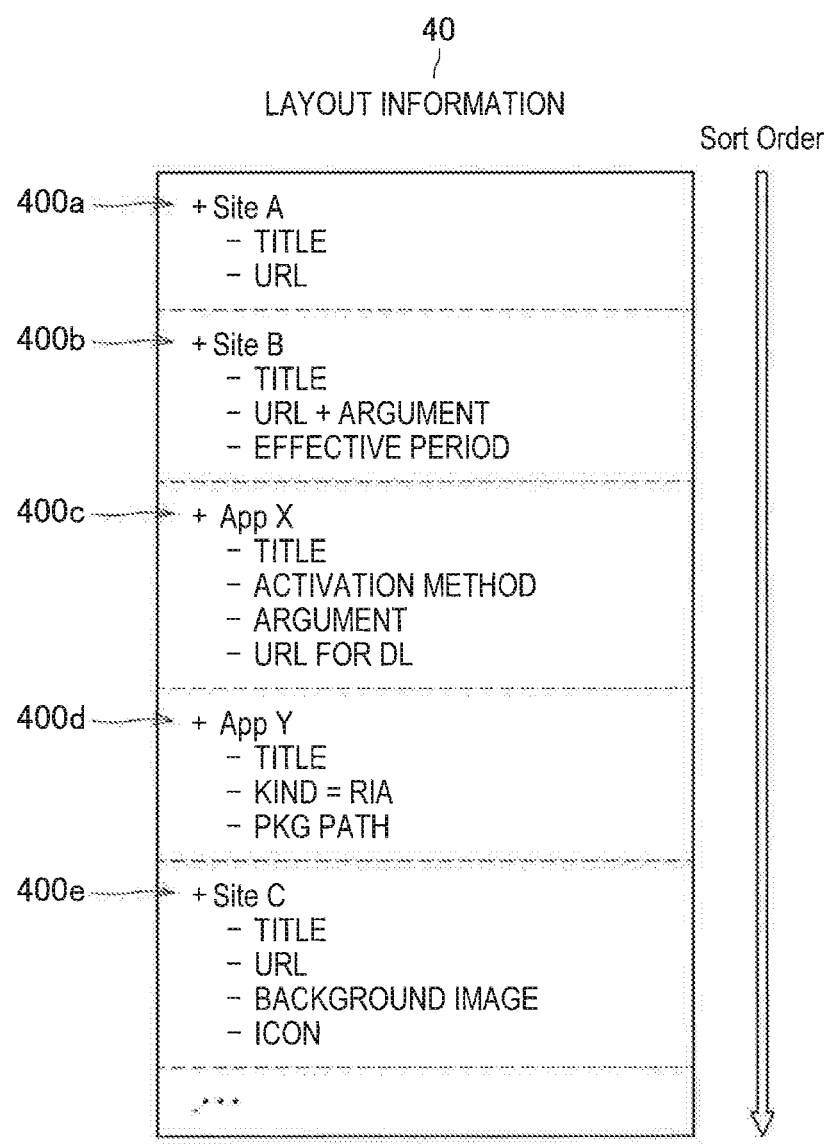
FIG. 7 is an explanatory diagram illustrating an example of the configuration of layout information according to the embodiment.

Here, an example of the configuration of the layout information will be described with reference to FIG. 7. FIG. 7 is an explanatory diagram illustrating an example of the configuration of layout information (layout information 40) according to the first embodiment. As illustrated in FIG. 7, the layout information 40 includes display designation information 400 regarding each link destination in regard to the plurality of link destinations correlated with the tag ID. Here, the display designation information 400 includes, for example, a title of the link destination or link information indicating the position of the link destination such as a URL or a path. As indicated by the display designation information 400b, the display designation information 400 may further include information indicating an available period such as an effective period of the link destination. As indicated by the display designation information 400c, the display designation information 400 may include a specific activation method for an application and an argument. According to the display designation information 400e, for example, when the user selects "App X" with the information processing terminal 10, the information processing terminal 10 can execute "App X" as instructed in the layout information 40. As indicated by display designation information 400d, the display designation information 400 may include information for designating a kind of application. The display designation information 400d indicates an example in which Rich Internet Applications (RIA) is designated as the kind of application. According to the display designation information 400d, for example, when the user selects "App Y" with the information processing terminal 10, the information processing terminal 10 acquires only some of the information from the link server 30 and executes an application in a runtime of the information processing terminal 10. As indicated by display designation information 400e, the display designation information 400 may further include image data of a background image, an icon, and the like displayed along with a title in the link list image or instruction information to display a background image, an icon, and the like stored in, for example, the information processing terminal 10.

As indicated by a downward arrow in FIG. 7, the layout information 40 further includes designation of a display priority such as an arrangement procedure of the link destinations. FIG. 7 illustrates an example of designation in which a display priority of link information that is listed higher in FIG. 7 is higher, for example, "Site A" is displayed higher than "Site B" in the link list image.

—Display Control Unit 104—

A. Function when Link List Image is Generated

The display control unit 104 generates the link list image based on the layout information acquired from the management server 20 and displays the generated link list image on the display screen.

A-1. Control Example 1

More specifically, the display control unit 104 can dispose a link image correlated with each of the plurality of pieces of link information inside the link list image in accordance with a layout indicated by the layout information.

Figure 8:
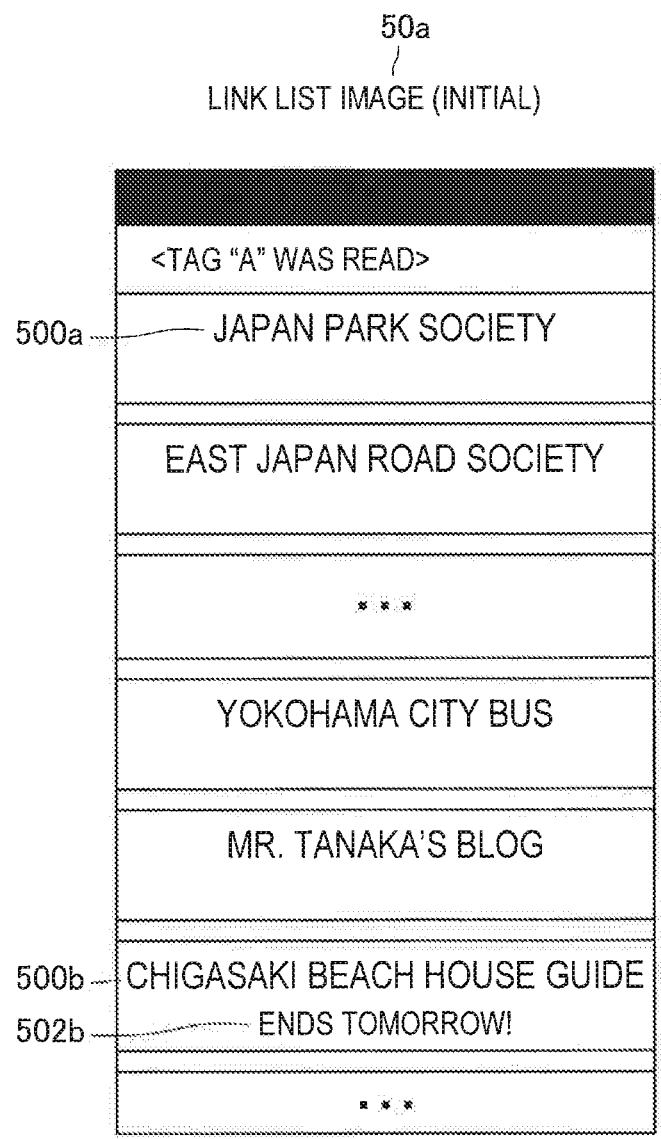
FIG. 8 is an explanatory diagram illustrating an example of the configuration of an initial link list image according to the embodiment.
Figure 9:
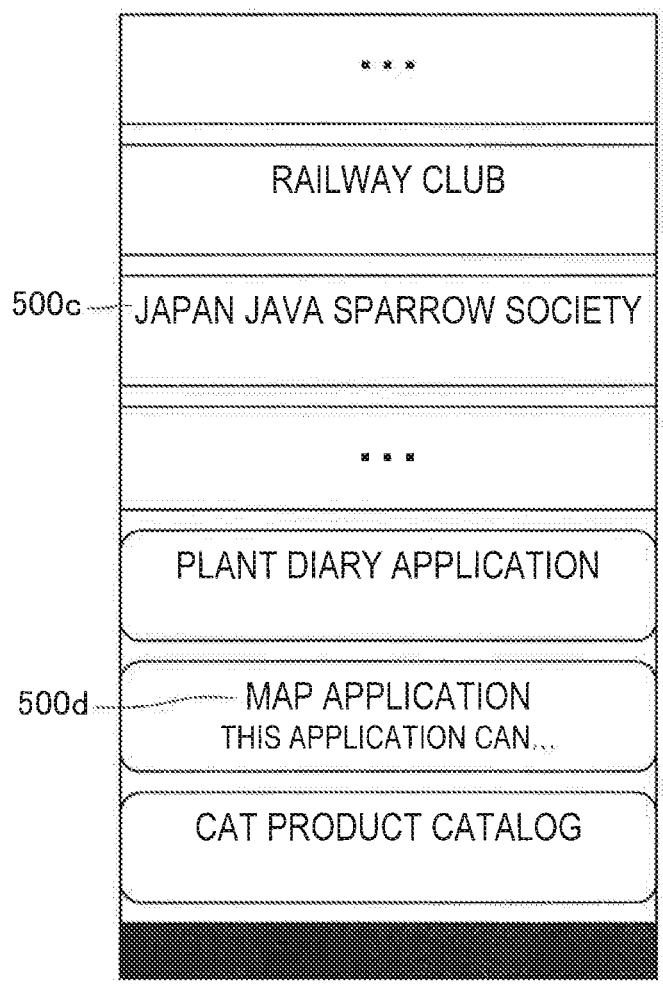
FIG. 9 is an explanatory diagram illustrating an example of the configuration of an initial link list image according to the embodiment.

Here, an example of the configuration of the link list image will be described with reference to FIGS. 8 and 9. FIGS. 8 and 9 are explanatory diagrams illustrating an example of the configuration of the link list image generated by the display control unit 104. As illustrated in FIGS. 8 and 9, for example, the display control unit 104 disposes a link image 500 correlated with each of the plurality of pieces of link information inside an initial link list image 50. The display control unit 104 generates the initial link list image 50 in a display order of the link information indicated by, for example, the layout information illustrated in FIG. 7. FIG. 8 illustrates an example of the initial link list image 50 when a display procedure in the layout information is decided in order of "Japan Park Society," "East Japan Road Society," "Yokohama City bus," "Mr. Tanaka's blog," etc.

A-2. Control Example 2

The display control unit 104 can dispose a character string designated by the layout information and indicating the title of a link destination inside the link image 500. For example, as illustrated in FIG. 8, the display control unit 104 disposes the title "Japan Park Society" inside a link image 500a.

A-3. Control Example 3

The display control unit 104 can also dispose a designation character string 502 designated by the layout information inside the link image 500. For example, as illustrated in FIG. 8, the display control unit 104 disposes a designation character string 502b "Ends tomorrow!" in addition to the title "Chigasaki Beach House Guide" inside the link image 500b.

A-4. Control Example 4

The display control unit 104 can also change a display form such as the shape, design, background color, or contour color of the link image 500 according to a kind of information acquired from a link destination. For example, as in a link image 500c in FIG. 8, the display control unit 104 displays the link image 500 as a rectangle when a kind of information acquired from a link destination is a web page. As in a link image 500d in FIG. 9, the display control unit 104 displays four corners of the link image 500 as curved lines when a kind of information acquired from a link designation is an application.

B. Function when Link List Image is Updated

The display control unit 104 acquires information from a link destination corresponding to each of the plurality of pieces of link information included in the layout information and controls the display form of the link list image based on the acquired information.

B-1. Control Example 1

Figure 10:
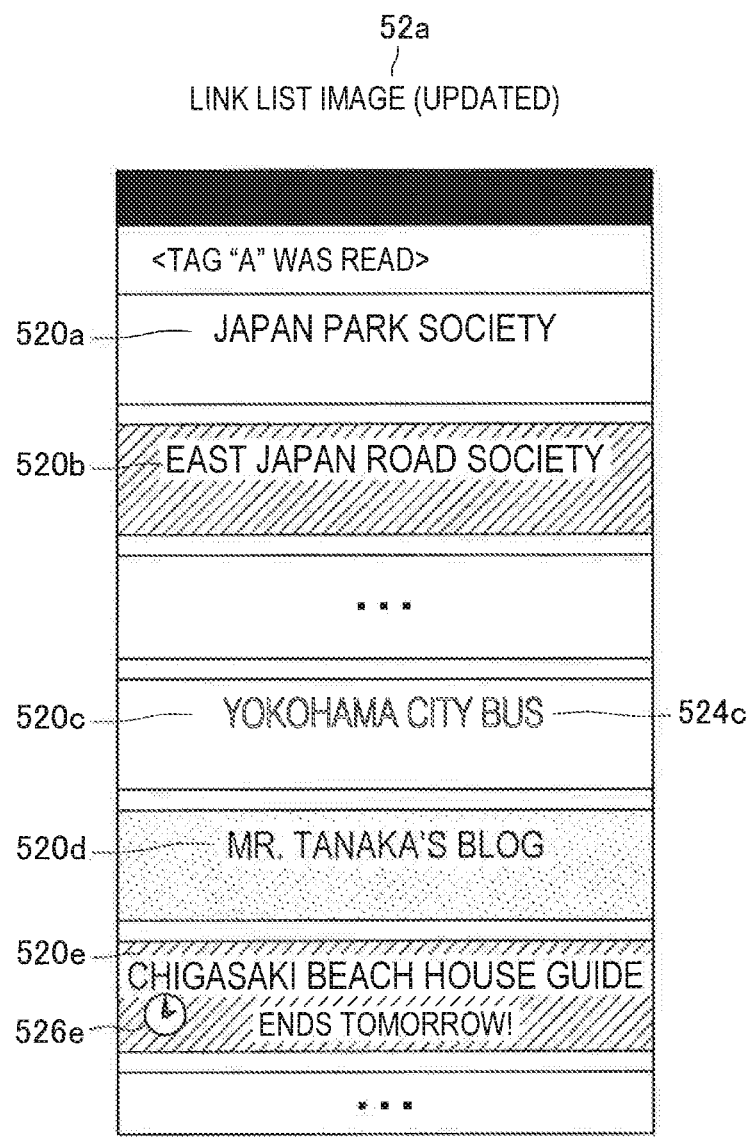
FIG. 10 is an explanatory diagram illustrating an example of the configuration of a link list image after updating according to the embodiment.
Figure 11:
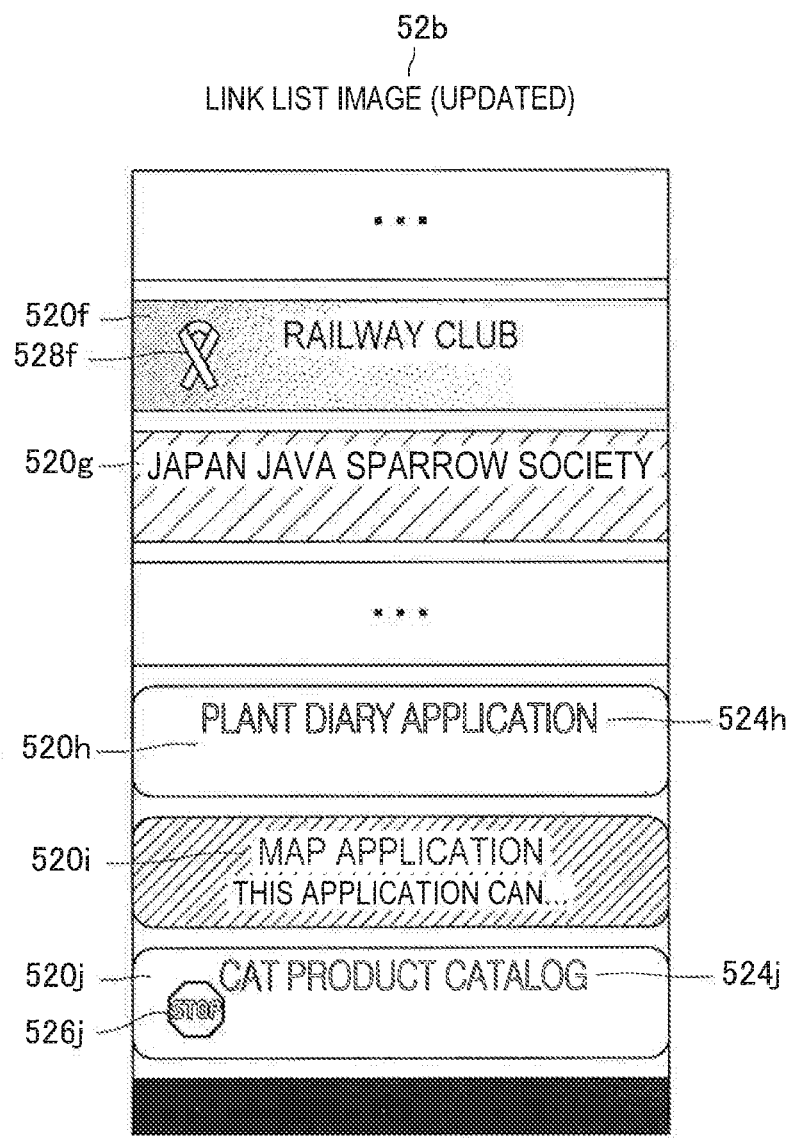
FIG. 11 is an explanatory diagram illustrating an example of the configuration of a link list image after updating according to the embodiment.

Here, examples of the configurations of the link list image will be described with reference to FIGS. 10 and 11. FIGS. 10 and 11 are explanatory diagrams illustrating the examples of the configurations of link list images (the updated link list images 52) updated by the display control unit 104. For example, as illustrated in a link image 520a and a link image 520b in FIG. 10 and a link image 520g in FIG. 11, the display control unit 104 can change the display form such as the background color of the corresponding link images 520 according to an acquisition situation of the information from the link destinations. The link image 520a is a display example indicating a situation in which no information is acquired from the link destination, the link image 520b is a display example indicating a situation in which information is acquired from the link destination, and a link image 520f is a display example indicating a situation in which information is being acquired from the link destination. As indicated in the link image 520f, the display control unit 104 may dynamically change the background color of the link image 520, for example, may change the background color gradually from the left side to the right side, according to the acquisition situation of the information from the link destination.

When link information corresponding to the link image 520 is selected previously by the user, as indicated in a link image 520d, the display control unit 104 can also cause the background color of the link image 520 to be different from those of the other link images 520. As indicated in a link image 520h to a link image 520j, the display control unit 104 can change the background colors of the link images 520 according to whether or not an application can be activated. The link image 520i is a display example indicating that an application can be activated and link images 520h and 520j are display examples indicating that applications may not be activated, for example, because an application has not been downloaded.

For example, when connection with a link destination is not possible due to non-discovery of the link destination, as indicated in a link image 520c, the display control unit 104 can also cause the style of characters of a title 524c to be different from those of the other link images 520.

The display control unit 104 can dispose a state icon 526 indicating a link destination state inside the link image 520. For example, as indicated in a link image 520e, the display control unit 104 disposes a state icon 526e indicating that an available period is set in a link destination inside the link image 520. As indicated in the link image 520j, the display control unit 104 disposes a state icon 526j indicating that an application stored in the information processing terminal 10 does not correspond to data acquired from a link destination inside the link image 520.

As indicated in the link image 520f, the display control unit 104 can also dispose an image such as a custom icon 528 acquired from a link destination inside the link image 520. The custom icon 528 is, for example, a predetermined icon of each site such as a logo mark of each site.

Figure 12:
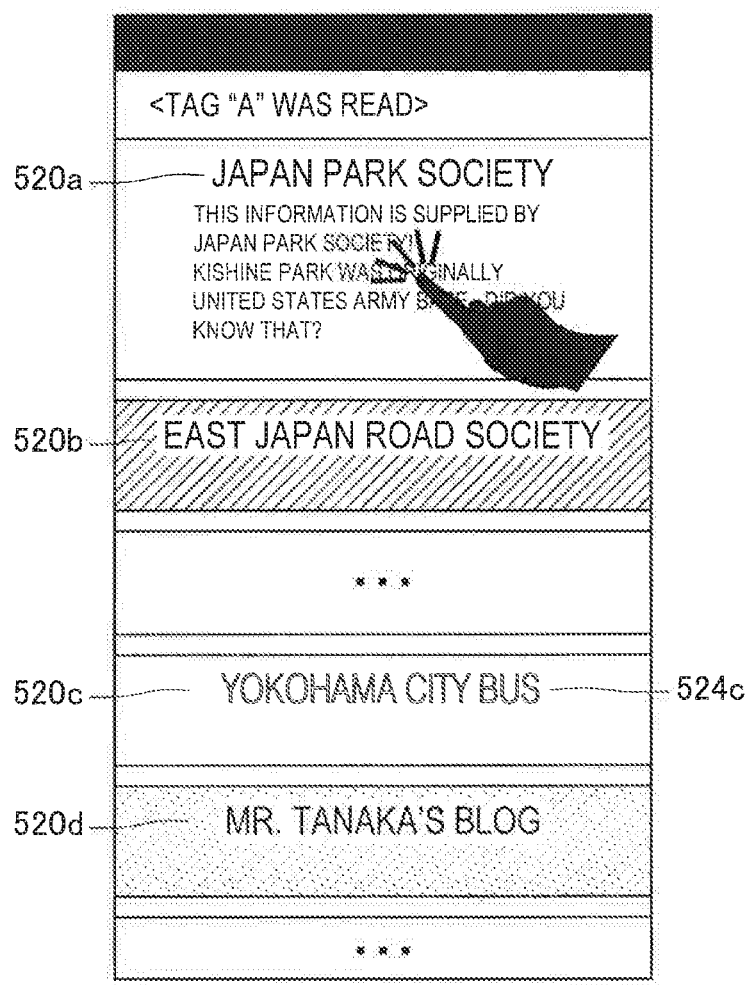
FIG. 12 is an explanatory diagram illustrating an example of the configuration of a link list image after updating according to the embodiment.

As described above, the display control unit 104 generates the link list images 52 after the updating illustrated in FIGS. 10 to 12 by adding various kinds of information based on information received from the link destinations in regard to the initial link list image 50 illustrated in FIG. 8 or 9. Therefore, for example, the user can easily recognize the acquisition situation of the information from the link destination, the link destination state, or the like by merely confirming the display form of the link image 500, and thus can more easily select a desired link destination.

In the foregoing description, the example in which the image such as the state icon 526 or the custom icon 528 is acquired from the link destination has been described, but embodiments of the present disclosure are not limited to this example. For example, this image may be included in the layout information. This image may be stored in the information processing terminal 10 and instruction information regarding display may be included in the layout information. The display control unit 104 can dispose the image such as the state icon 526 or the custom icon 528 inside the link image 520, as instructed in the layout information. In the foregoing description, the example in which the display control unit 104 continuously updates the display form of the link list image during the acquisition of the information from each link destination has been described, but embodiments of the present disclosure are not limited to this example. For example, the information processing terminal 10 may receive information from each link destination on a background and, for example, the display control unit 104 may collectively update the display form of the link list image at a predetermined timing such as the time of completion of the reception of the information.

B-2. Control Example 2

The display control unit 104 can also further display content of information acquired from the link destination on the display screen. Here, the information acquired from the link destination is, for example, information previewed from the link destination. For example, when the link destination is a web page, information acquired from the link destination is, for example, a part of a character string or an image included in the web page.

More specifically, the display control unit 104 can display content of the information acquired from the link destination in association with the link image corresponding to the link destination. For example, as illustrated in FIG. 12, the display control unit 104 displays a character string acquired from a site with a title "Japan Park Society" inside the link image 520*a*. In the example illustrated in FIG. 12, the display control unit 104 can also display information dedicated for display in the link list image, such as a character string summarized by the information summarization unit 106 to be described below, inside the link image 520 instead of a character string acquired from the link destination.

B-3. Control Example 3

When one link image is selected on the display screen by the user, the display control unit 104 can display content of information acquired from the link destination corresponding to the selected link image on the display screen. For example, when the link image 520*a* is selected such as when a user presses and holds it with his or her finger in the example illustrated in FIG. 10, the display control unit 104 displays a character sting received from a site corresponding to the link image 520*a* inside the link image 520*a*, as illustrated in FIG. 12. In the display example, the user can confirm the information acquired from a desired link destination in the link list image by selecting the link image corresponding to the desired link destination in the link list image. That is, the user can confirm the more detailed information regarding the desired link destination on the same screen.

B-4. Control Example 4

The display control unit 104 may not dispose a link image corresponding to link information satisfying a display rejection condition decided based on a manipulation of the user of the information processing terminal 10 either among a plurality of pieces of link information included in the layout information inside the link list image. Here, the display rejection condition may be a condition indicating whether a category of the link destination indicated by the link information corresponds to a category for which display is rejected by the user. The display rejection condition may be a condition indicating whether a category of at least some of the information acquired from the link destination indicated by the link information is a category for which display is rejected by the user. The display rejection condition may be a condition indicating whether a character string or an image for which display is rejected by the user is included in information acquired from the link destination indicated by the link information.

B-5. Control Example 5

The display control unit 104 can change a method of displaying the information acquired from the link destination based on an attribute of a display displaying the display screen. Here, the attribute of the display includes, for example, a display direction of the display, the resolution of the display, or a display function of the display. The display may be included in the information processing terminal 10 or may be included in another device capable of communicating with the information processing terminal 10.

Figure 14:
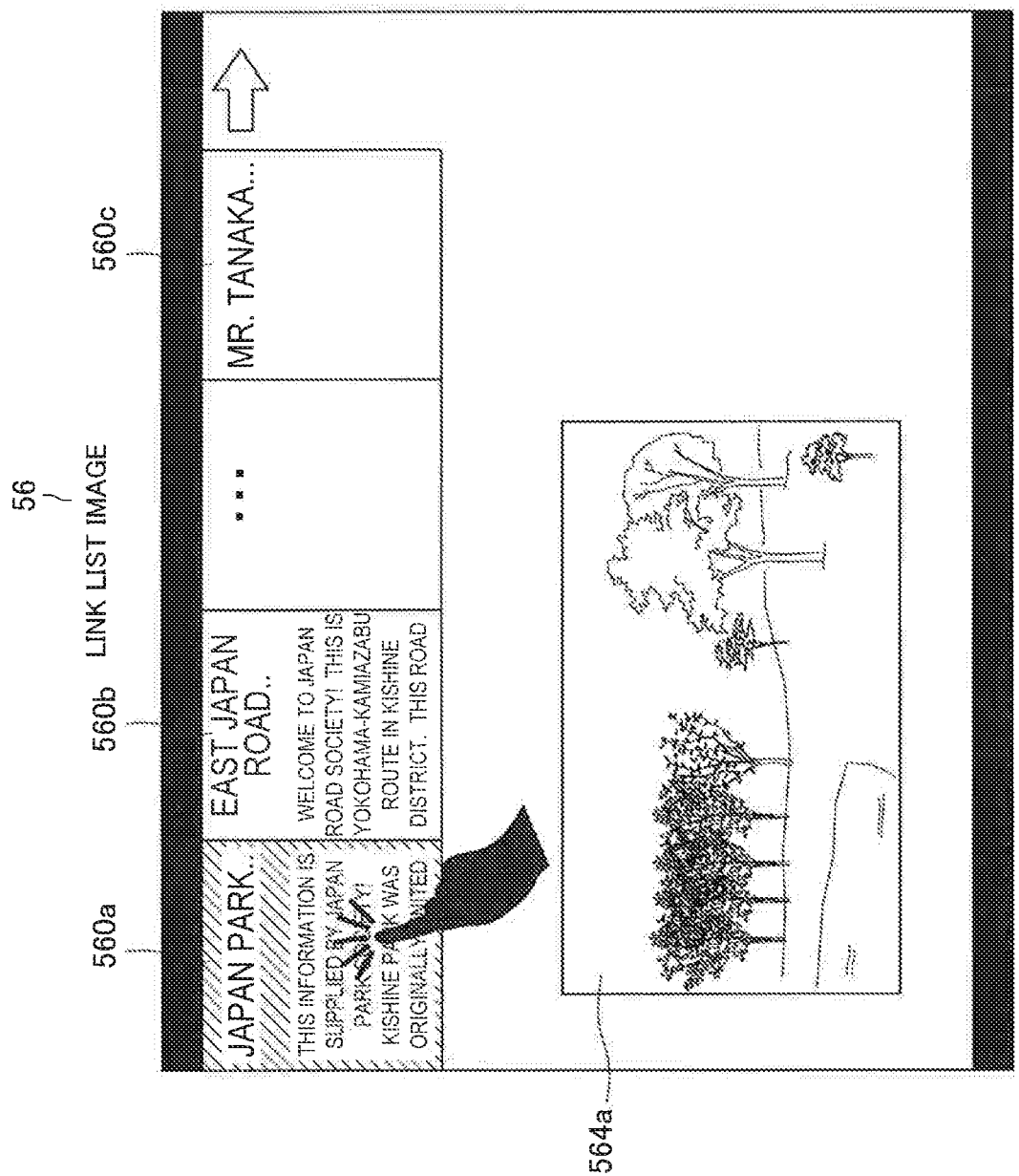
FIG. 14 is an explanatory diagram illustrating a display example of a link list image of a horizontal screen according to the embodiment.

For example, the display control unit 104 changes the method of displaying the information acquired from the link destination based on the display direction of the display screen. As illustrated in FIG. 12, when the display screen is displayed in the vertical direction, the display control unit 104 sequentially displays the plurality of link images 520 in the vertical direction and displays the information acquired from the link destination as in the link image 520*a* inside the corresponding link image 520. As illustrated in FIG. 14, when the display screen is displayed in the horizontal direction, the display control unit 104 sequentially displays the plurality of link images 520 in the horizontal direction and displays the information acquired from the link destination as in a link image 560*a* inside a corresponding link image 560.

Figure 13:
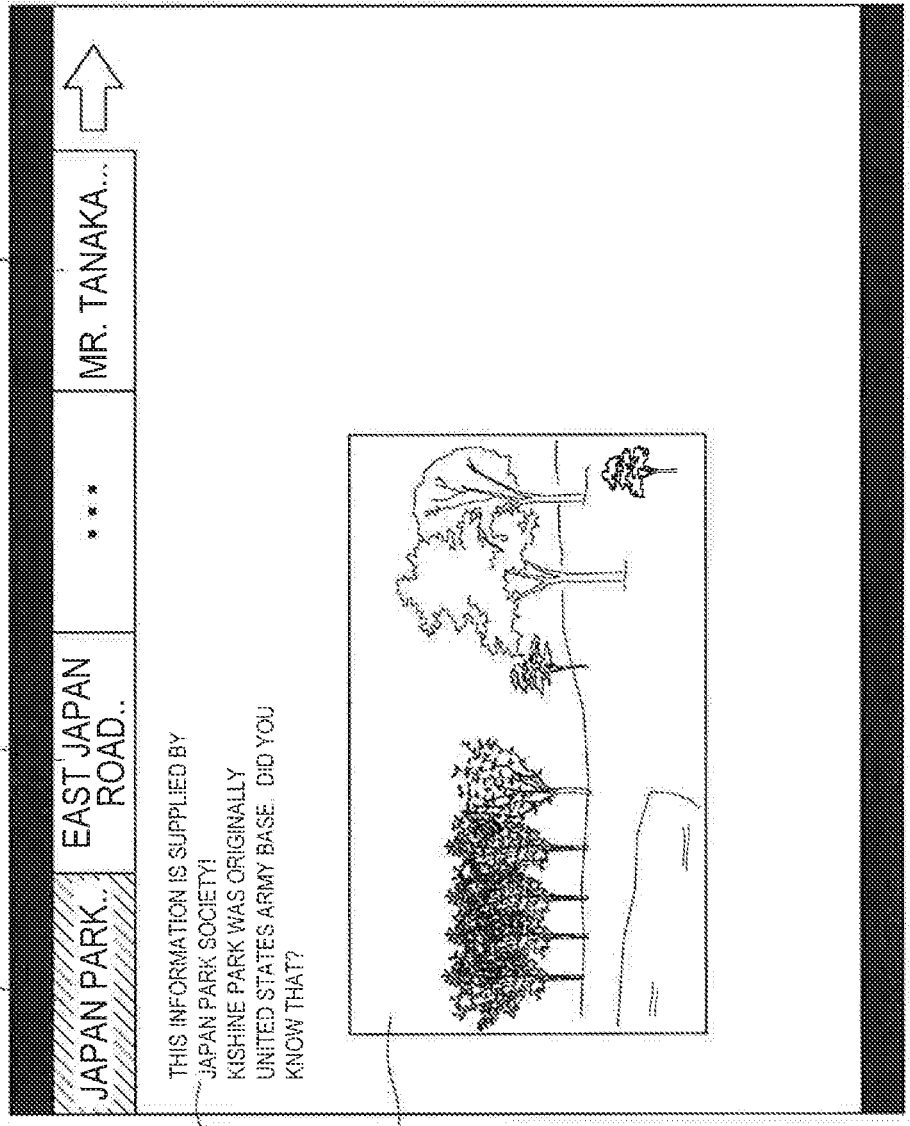
FIG. 13 is an explanatory diagram illustrating a display example of a link list image of a horizontal screen according to the embodiment.

The display control unit 104 changes an amount of information displayed on the display screen in regard to the information acquired from the link destinations based on the resolution of the display. More specifically, the display control unit 104 increases the amount of information displayed on the display screen as the resolution of the display is higher. Here, the function will be described in more detail with reference to FIGS. 13 and 14. FIGS. 13 and 14 are explanatory diagrams illustrating display examples of the link list images when the display screen is displayed in the horizontal direction. A link list image 54 illustrated in FIG. 13 is an example of a link list image when the resolution of the display is low. A link list image 56 illustrated in FIG. 14 is an example of a link list image when the resolution of the display is high.

As illustrated in FIG. 13, when the resolution of the display is low, the display control unit 104 decreases the display size of each link image 540 in the link list image 54 and disposes information regarding, for example, a character string 542*a* or an image 544*a* acquired from the link destination in a region outside the link image 540. As illustrated in FIG. 13, the display control unit 104 may dispose only information regarding a character string or an image acquired from the link destination corresponding to the link image (the link image 540*a*) selected by the user in a region outside the link image 540. As illustrated in FIG. 14, when the resolution of the display is high, the display control unit 104 increases the display size of each link image 560 in the link list image 56 and disposes information regarding, for example, a character string acquired from the link destination inside the link image 560.

In the display example, the amount of displayed information among the information acquired from the link destinations is adjusted based on the resolution of the display. Therefore, the user can view the information acquired from the link destination with, for example, the number of characters or an image size which is easily viewed on the display screen, and thus may view it with less stress.

Figure 15:
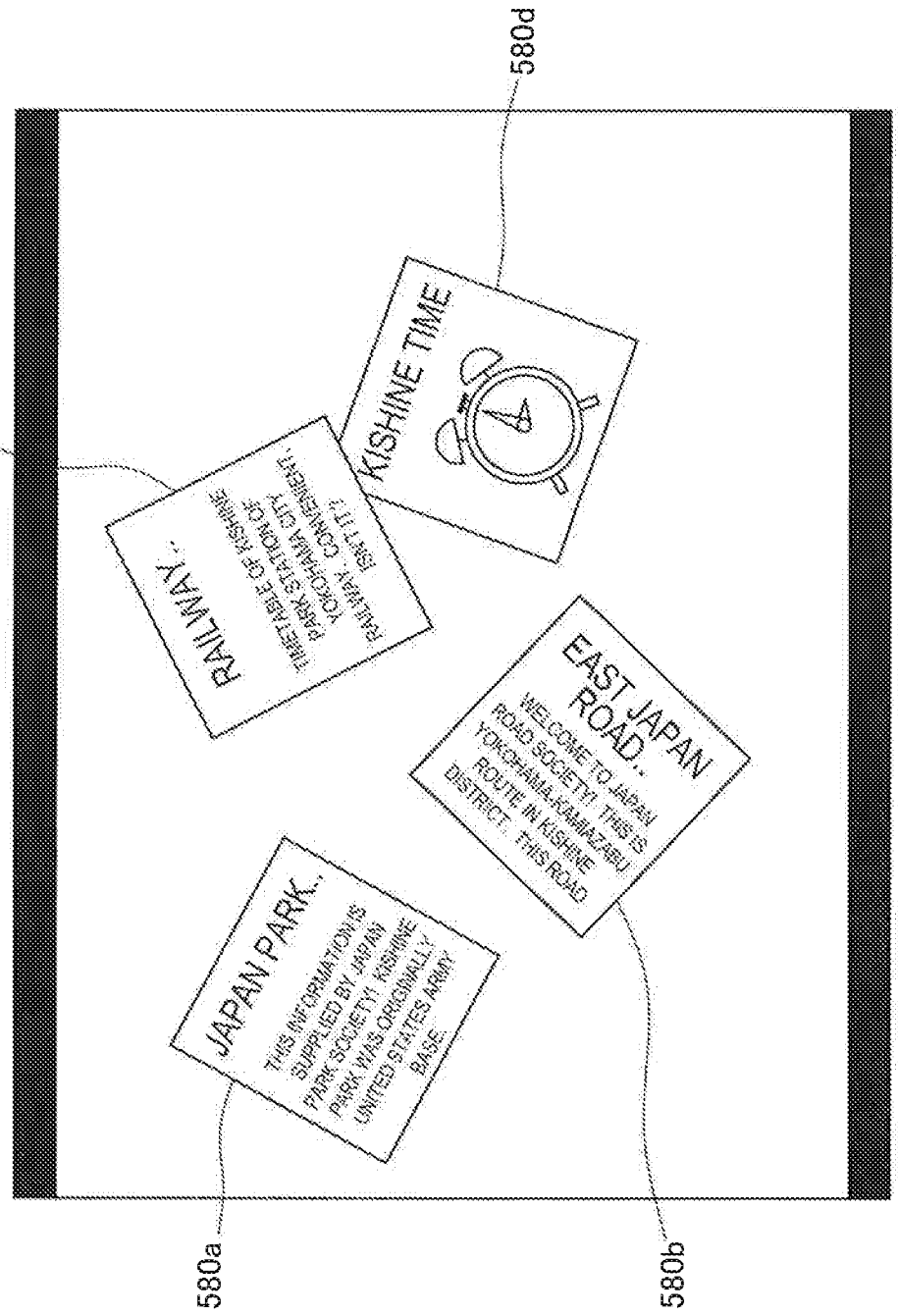
FIG. 15 is an explanatory diagram illustrating a display example of a link list image in a table-size tablet terminal according to the embodiment.

The display control unit 104 changes the method of displaying the information acquired from the link destination based on a display function of the display. Here, the function will be described in more detail with reference to FIG. 15. FIG. 15 is an explanatory diagram illustrating a display example of a link list image (a link list image 58) when the information processing terminal 10 is a tablet terminal with a table size. The tablet terminal with the table size includes, for example, a table type display including a touch panel on which a user can select a desired position on the screen by pressing the display with his or her finger, a stylus, or the like. The tablet terminal with the table size can display data recorded on a recording medium on the display, for example, when the user connects a USB memory or brings a card with an IC chip into contact with a table. FIG. 15 illustrates an example in which each link image 580 is displayed in a random orientation, but embodiments of the present disclosure are not limited to this example. For example, the link images may be arranged in the vertical or horizontal direction to be displayed.

For example, as illustrated in FIG. 15, the display control unit 104 displays each link image 580 in any direction within 360° on the display based on a user manipulation of changing the display direction of the link image 580. As a link image 580c is superimposed on a part of a link image 580d in FIG. 15, the display control unit 104 displays the link images 580 so that the link images are superimposed based on a user manipulation of changing the display position of the link images 580.

B-6. Control Example 6

The display control unit 104 can also change the method of displaying the information acquired from the link destinations based on a display setting designated by the user. For example, when the display direction is set to the vertical direction by the user, the display control unit 104 displays the link list image in the vertical direction, as illustrated in FIGS. 10 to 12. When the display direction is set to the horizontal direction by the user, the display control unit 104 displays the link list image in the horizontal direction, as illustrated in FIG. 13 or 14. According to this modification example, it is possible to adjust the display form of the link list image in accordance the user's preference for screen display.

B-7. Control Example 7

The display control unit 104 can also display content of information summarized by the information summarization unit 106 to be described below inside the link list image instead of the information acquired from the link destinations.

—Information Summarization Unit 106—

Figure 16:
FIG. 16 is an explanatory diagram illustrating a function of an information summarization unit 106 according to the embodiment.

The information summarization unit 106 has a function of summarizing content of information acquired from a link destination. For example, as illustrated in FIG. 16, the information summarization unit 106 omits a part of a character string acquired from a link destination or decreases a font size of a character string displayed on the display screen. For example, the information summarization unit 106 summarizes a character string acquired from a link destination, for example, by analyzing morphemes of the character string acquired from the link destination and eliminating some adverbs and adjectives among the analyzed morphemes. The information summarization unit 106 generates thumbnails of images acquired from the link destinations. It is possible to obtain the advantage of displaying the information acquired from the link destinations according to the display function, the resolution, or the like of the display so that visibility is high and the user can easily understand the information.

—Transmission Control Unit 108—

Figure 17:
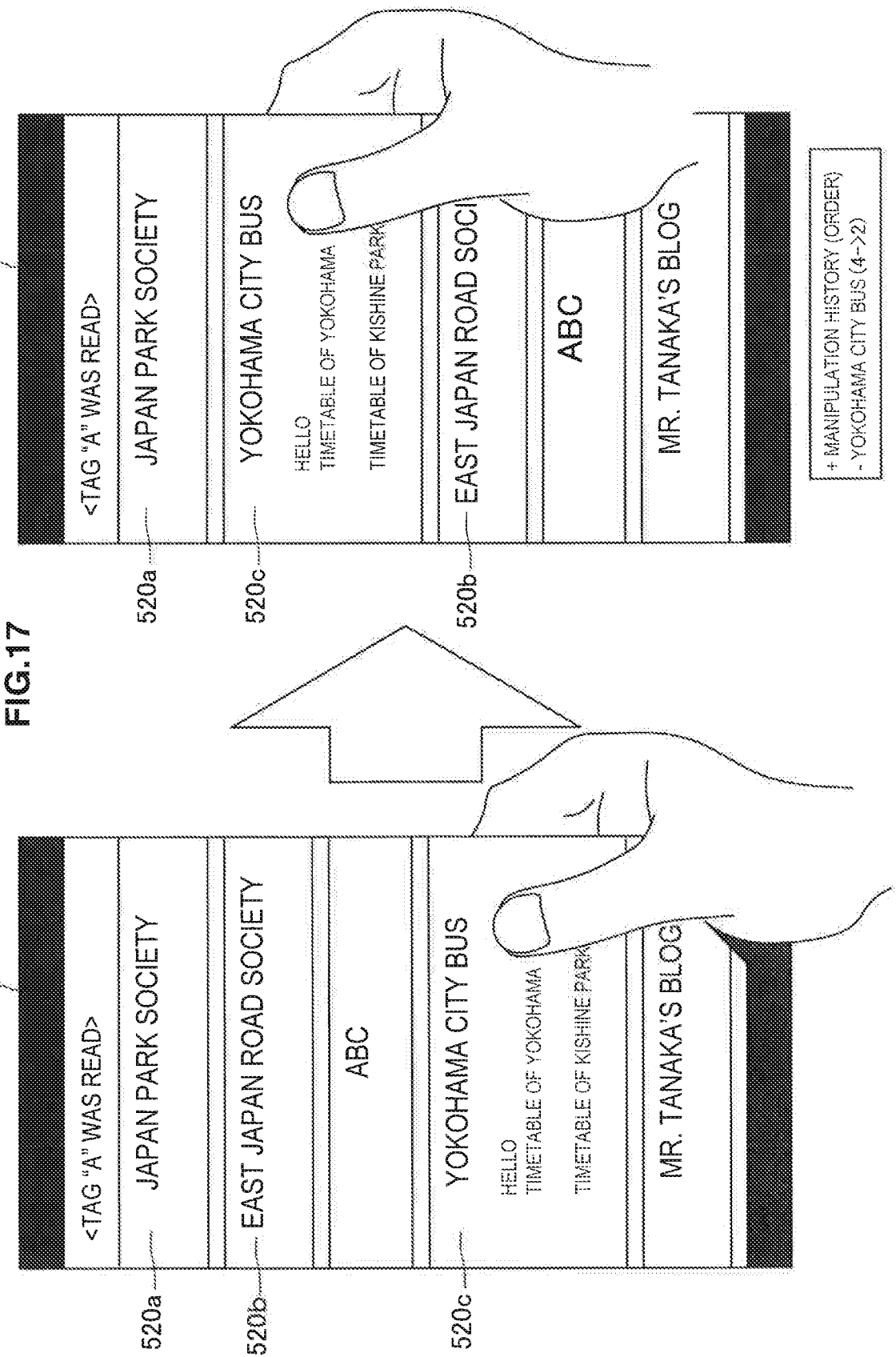
FIG. 17 is an explanatory diagram illustrating a manipulation example in the link list image according to the embodiment.

The transmission control unit 108 causes the communication unit 120 to transmit information indicating a user manipulation history on the display screen to the management server 20. For example, as illustrated in FIG. 17, when the user performs a manipulation of moving the link image 520c with the title "Yokohama City bus" from the fourth position from the top to the second position from the top in the link list image 52, the transmission control unit 108 causes the communication unit 120 to transmit information indicating manipulation content of changing the display position of the link image 520c from the fourth position to the second position to the management server 20.

The transmission control unit 108 can cause the communication unit 120 to transmit information indicating a reading history of the tag ID by the tag reading unit 126 to be described below to the management server 20.

—Communication Unit 120—

The communication unit 120 transmits and receives information to and from various devices connected to the communication network 12 via the communication network 12. For example, the communication unit 120 transmits a message used for the request unit 102 to request the management server 20 to supply the layout information to the management server 20. Then, the communication unit 120 receives the layout information from the management server 20.

—Display Unit 122—

The display unit 122 displays a display screen under the control of the display control unit 104. For example, the display unit 122 displays the link list image generated or updated by the display control unit 104 on the display screen.

—Input Unit 124—

The input unit 124 receives various user manipulations on the information processing terminal 10. For example, the input unit 124 receives a manipulation of selecting one link image among the link list images displayed on the display screen. In FIG. 6, the example in which the display unit 122 and the input unit 124 are configured separately is illustrated. However, for example, the display unit 122 and the input unit 124 may be configured to be integrated as in a touch panel.

—Tag Reading Unit 126—

The tag reading unit 126 is an example of an information acquisition unit according to an embodiment of the present disclosure. The tag reading unit 126 has a function of reading the tag ID from the tag 14. For example, the tag reading unit 126 reads the tag ID from the tag 14 by causing the reader 170 to transmit carrier waves with a high frequency to the tag 14. The tag reading unit 126 reads the tag ID from the tag 14 by causing the IC chip 166 to receive carrier waves with a high frequency arriving from the tag 14. The tag reading unit 126 reads the tag ID from the tag 14 by imaging the tag 14.

As described above, when the tag 14 has the link information regarding the management server 20 or the auxiliary information of the link information regarding the management server 20, the tag reading unit 126 can also read this information.

—Storage Unit 128—

The storage unit 128 is configured by a storage device such as a semiconductor memory or a magnetic disk. The storage unit 128 stores, for example, the layout information received from the management server 20 or information indicating a reading history by the tag reading unit 126.

According to the first embodiment, a computer program can also be supplied so that the hardware such as the CPU 150, the ROM 152, and the RAM 154 included in the information processing terminal 10 has the same functions as the configurations of the above-described information processing terminal 10. A storage medium storing the computer program is also supplied.

The configuration of the information processing terminal 10 according to the first embodiment is not limited to the above-described configuration. For example, one or more of the communication unit 120, the display unit 122, the input unit 124, and the storage unit 128 may not be included in the information processing terminal 10, but may be included in other devices.

(3-1-1-2. Management Server 20)

Figure 18:
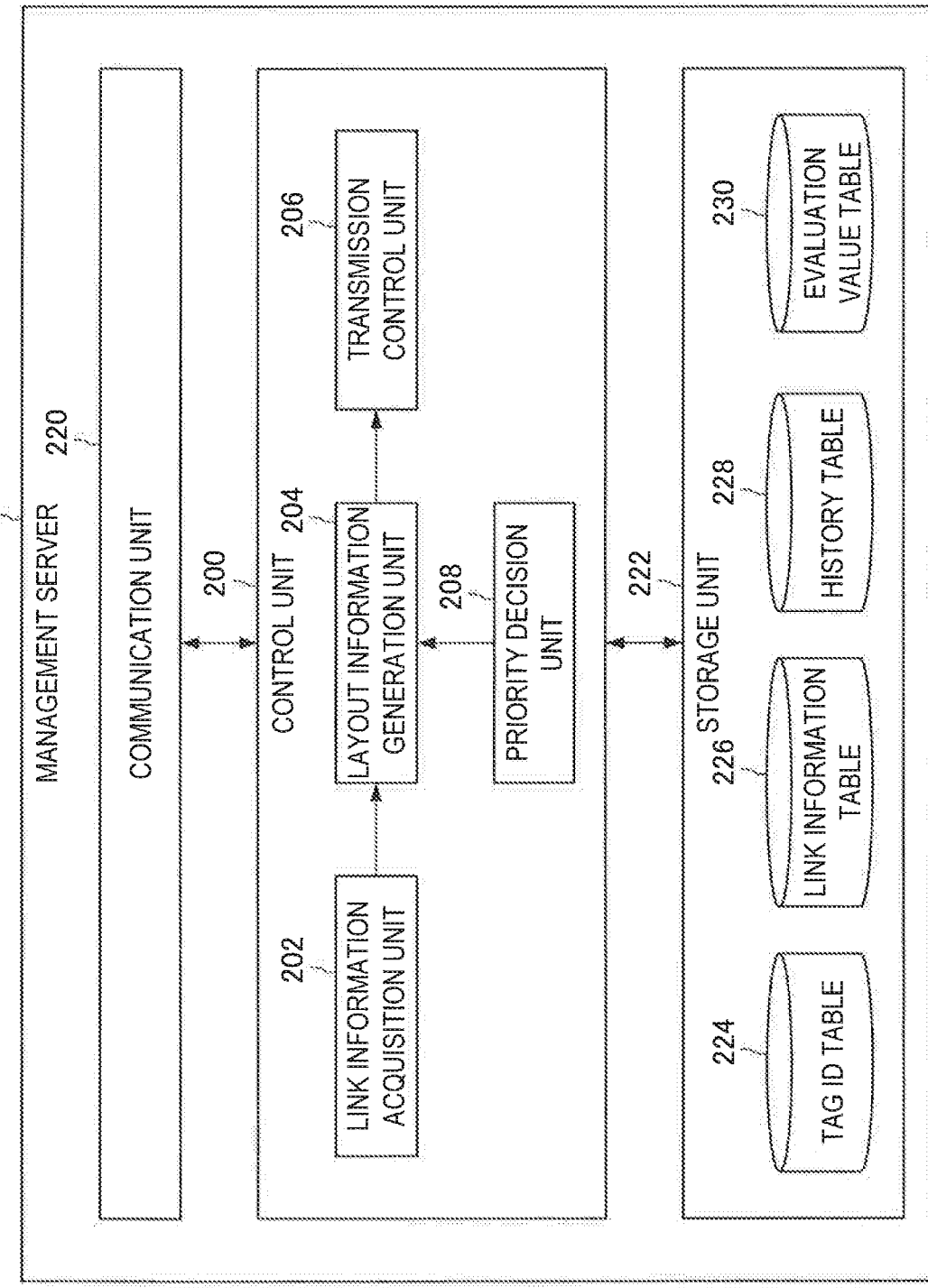
FIG. 18 is a functional block diagram illustrating the configuration of a management server 20 according to the embodiment.

FIG. 18 is a functional block diagram illustrating the configuration of the management server 20 according to the first embodiment. As illustrated in FIG. 18, the management server 20 includes the control unit 200, the communication unit 220, and the storage unit 222. The control unit 200 includes the link information acquisition unit 202, the layout information generation unit 204, the transmission control unit 206, and the priority decision unit 208.

—Control Unit 200—

The control unit 200 generally controls an operation of the management server 20 using the hardware of the CPU 250, the RAM 254, and the like included in the management server 20. For example, the control unit 200 controls operations of the communication unit 220 and the storage unit 222.

—Link Information Acquisition Unit 202—

The link information acquisition unit 202 acquires the plurality of pieces of link information correlated with the tag ID based on reception of the tag ID from the information processing terminal 10. For example, the link information acquisition unit 202 acquires the plurality of pieces of link information correlated with the tag ID received from the information processing terminal 10 by referring to recording content of a link information table 226 to be described below.

—Layout Information Generation Unit 204—

The layout information generation unit 204 generates the layout information including the plurality of pieces of link information acquired by the link information acquisition unit 202, as illustrated in, for example, FIG. 7. More specifically; the layout information generation unit 204 can generate the layout information including a character string or an image displayed in association with each of the plurality of pieces of link information in the link list image. For example, the layout information generation unit 204 generates the layout information including each link image 500 illustrated in FIGS. 8 and 9, a designation character string 502 illustrated in FIG. 8, or the state icon 526 or the custom icon 528 illustrated in FIGS. 10 and 11, as described in section 3-1-1-1. The layout information generation unit 204 can also acquire the information such as the character string 542 or the image 544 illustrated in FIG. 13 in advance from the link server 30 and generate the layout information further including such information.

The layout information generation unit 204 can also generate the layout information not including the link information satisfying a display rejection condition received from the information processing terminal 10 among the plurality of pieces of link information acquired by the link information acquisition unit 202. The display rejection condition is substantially the same as the display rejection condition described in section 3-1-1-1.

The layout information generation unit 204 can generate the layout information according to a display priority decided by the priority decision unit 208 to be described below. Here, the display priority may be the display order of the link information (link images) in the link list image, as illustrated in FIG. 7, or a precedence of the degree of display emphasis of the link information (link images), such as a size precedence of display sizes in the link list image. For example, the layout information generation unit 204 generates the layout information such that the plurality of pieces of link information acquired by the link information acqui- sition unit 202 are displayed in a procedure of the display priority decided by the priority decision unit 208, as illustrated in FIG. 7.

The layout information generation unit 204 further generates the layout information based on the information regarding information processing terminal 10 received from the information processing terminal 10. Here, the information regarding the information processing terminal 10 includes a display direction of the display included in the information processing terminal 10, the resolution of the display included in the information processing terminal 10, a display function of the information processing terminal 10, or a display setting of the information processing terminal 10.

For example, when the display direction of the display is the vertical direction, the layout information generation unit 204 generates the layout information including an instruction to display the link list image in the vertical direction, as illustrated in FIG. 8 or 9. When the display direction of the display is the horizontal direction, the layout information generation unit 204 generates the layout information including an instruction to display the link list image in the horizontal direction, as illustrated in FIG. 13 or 14. When the resolution of the display is less than a predetermined value, as illustrated in FIG. 13, the layout information generation unit 204 generates the layout information including an instruction to display each link image 540 small in the link list image and to dispose the information acquired from the link destination outside the link image. When the resolution of the display is equal to or greater than the predetermined value, as illustrated in FIG. 14, the layout information generation unit 204 generates the layout information including an instruction to display each link image 560 large in the link list image and to dispose the information acquired from the link destination inside each link image.

—Transmission Control Unit 206—

The transmission control unit 206 causes the communication unit 220 to transmit the layout information generated by the layout information generation unit 204 to the information processing terminal 10.

—Priority Decision Unit 208—

The priority decision unit 208 decides the display priority of the plurality of pieces of link information in the link list image generated by the information processing terminal 10.

Decision Example 1

More specifically, the priority decision unit 208 can decide the display priority of the plurality of pieces of link information in the link list image based on information regarding the user of the information processing terminal 10. The user of the information processing terminal 10 may be an individual user using the target information processing terminal 10 or may be all of the users using the information processing terminal 10.

Here, the information regarding the user of the information processing terminal 10 may be a manipulation history in regard to the link list image of the user. For example, when the user performs a manipulation of changing an arrangement position of the link image 520 to a higher rank (or a lower rank) in the link list image, as illustrated in FIG. 17, the priority decision unit 208 decides the display precedence of the link information corresponding to the manipulated link image 520 so that the display precedence of the link information is higher (or lower). When the user performs a manipulation of changing a stacking position of the link image 520 to a higher rank (or a lower rank) in the tablet terminal with the table size illustrated in FIG. 15, the priority decision unit 208 decides the display precedence of the link information corresponding to the manipulated link image 520 so that the display precedence of the link information is higher (or lower). When the user selects one link image 520 in the link list image 52, as illustrated in FIG. 12, the priority decision unit 208 decides the display precedence of the link information corresponding to the selected link image 520 so that the display precedence of the link information is higher. When the user cancels the selection of one link image 520 in the link list image 52, the priority decision unit 208 decides the display precedence of the link information corresponding to the link image 520 for which the selection is cancelled so that the display precedence of the link information is lower. The priority decision unit 208 can acquire a manipulation history in regard to each user link list image, for example, by referring to recording content of a manipulation history table 232 to be described below.

In general, when the user performs any manipulation on a specific link image 520 in the link list image, the user is assumed to be interested in the link information corresponding to this link image 520. Therefore, in the decision example, the display precedence can be set to be higher for the link information more strongly estimated to interest the user.

The information regarding the user of the information processing terminal 10 may be a selection history of the link information of the user. For example, the priority decision unit 208 decides the display precedence such that the link information selected more recently by the user has higher display precedence. The priority decision unit 208 decides the display precedence such that the link information selected a greater number of times by the user has higher display precedence. The priority decision unit 208 decides the display precedence such that the link information selected more frequently by the user has higher display precedence. The priority decision unit 208 can acquire the selection history of the link information of the user, for example, by referring to recording content of a selection history table 234 to be described below.

The information regarding the user of the information processing terminal 10 may be a reading history of the tag ID. For example, the priority decision unit 208 decides the display precedence such that the link information correlated with the tag ID read more recently by the user has higher display precedence. The priority decision unit 208 decides the display precedence such that the link information correlated with the tag ID read a greater number of times by the user has higher display precedence. The priority decision unit 208 can acquire the reading history of the tag IDs of the users, for example, by referring to recording content of a reading history table 236 to be described below.

In general, when the user reads the tag ID, the user is assumed to be interested in the tag 14 or an object to which the tag 14 is affixed. Therefore, in the decision example, the display precedence can be set to be higher for the link information correlated with the tag 14 more strongly estimated to interest the user.

The information regarding the user of the information processing terminal 10 may be, for example, preference information indicating a category, a genre, or the like that the user likes. For example, when the preference information is received from the information processing terminal 10, the priority decision unit 208 decides the display precedence of the link information classified into a category indicated by the received preference information so that the display precedence of the link information is higher.

Decision Example 2

The priority decision unit 208 can also decide the display priority of the plurality of pieces of link information in the link list image based on evaluation values of the link destinations by a plurality of users. For example, the priority decision unit 208 decides the display precedence of the link information such that the link information that has a higher sum value or average value of the evaluation values of all the users accessing the management server 20 has higher display precedence. The priority decision unit 208 can acquire the evaluation values of each link destination by the plurality of users, for example, by referring to recording content of an evaluation value table 230 to be described below.

Decision Example 3

The priority decision unit 208 can also decide the display priority of the plurality of pieces of link information in the link list image based on a predetermined evaluation standard. The predetermined evaluation standard may be a numerical formula or the like decided in advance for evaluating the priority of the plurality of pieces of link information. The predetermined evaluation standard may be a standard decided by an administrator of the management server 20 or the like.

For example, when the category correlated with the link information belongs to a predetermined category, the priority decision unit 208 decides the display priority of the link information with higher display priority. When "traffic information" is set as the predetermined category in an example illustrated in FIG. 20, the priority decision unit 208 decides the display precedence of link information ("www.BBB.co.jp") corresponding to the link destination with the title "Yokohama. City bus" such that the display precedence of this link information is higher. In the decision example, since the management server 20 can set the display precedence of specific link information to be higher, the specific link information can be strongly recommended to the user of the information processing terminal 10.

Decision Example 4

The priority decision unit 208 can also decide the display priority of the plurality of pieces of link information in the link list image based on an attribute of the tag 14 indicated by the tag ID received by the information processing terminal 10. Here, the attribute of the tag 14 is, for example, a location at which the tag 14 is disposed, an object to which the tag 14 is affixed, or the color of the tag 14.

For example, when the location at which the tag 14 is disposed is included in a predetermined area, the priority decision unit 208 decides the display precedence of the link information correlated with the tag ID of the tag 14 to be higher. When the object to which the tag 14 is affixed is a predetermined object, the priority decision unit 208 decides the display precedence of the link information correlated with the tag ID of the tag 14 to be higher. The priority decision unit 208 can acquire information regarding the attribute of the tag 14 indicated by the tag ID, for example, by referring to recording content of a tag ID table 224 to be described below.

As described above, when the user reads the tag ID, the user is estimated to be interested in the tag 14 or the object to which the tag 14 is affixed. Therefore, in this decision example, the display precedence of the link information correlated with the tag 14 strongly estimated to interest the user can be set to be higher.

Decision Example 5

The priority decision unit 208 can also decide the display priority of the plurality of pieces of link information in the link list image based on a transmission time of the layout information. Here, the transmission time of the layout information may be a transmission time of the layout information to the target information processing terminal 10 or may be a transmission time of the layout information to all of the users. For example, the priority decision unit 208 decides the display precedence of the link information such that the link information included in the layout information transmitted more recently to the target information processing terminal 10 has higher display precedence.

—Communication Unit 220—

The communication unit 220 transmits and receives information to and from any of various devices connected to the communication network 12 via the communication network 12. For example, the communication unit 220 transmits the layout information to the information processing terminal 10 under the control of the transmission control unit 206. The communication unit 220 receives the tag ID from the information processing terminal 10.

—Storage Unit 222—

As illustrated in FIG. 18, the storage unit 222 stores, for example, the tag ID table 224, the link information table 226, the history table 228, and the evaluation value table 230, as illustrated in FIG. 18.

—Tag ID Table 224—

The tag ID table 224 is a table in which information regarding each of the currently used tags 14 is recorded. FIG. 19 is an explanatory diagram illustrating an example of the configuration of the tag ID table 224. In the tag ID table 224, as illustrated in Ho. 19, for example, tag ID 2240, location 2242, affixed object 2244, and color 2246 are correlated and recorded. Here, in the tag ID 2240, values of the tag IDs are recorded. In the location 2242, locations at which the tags 14 are disposed are recorded. In the affixed object 2244, objects to which the tags 14 are affixed are recorded. In the color 2246, the colors of the tags 14 are recorded. For example, data shown in the first record in FIG. 19 indicates that the tag ID is "1001," the location at which the tag 14 is disposed is "Tokyo AAA," the object to which the tag 14 is affixed is "poster," and the color of the tag 14 is "black."

The records are registered in the tag ID table 224, for example, as follows. First, the tag ID is registered in the tag ID table 224 as follows. When the management server 20 receives a numbering request of the tag ID from an administrator or the like of the tag 14 at the time of manufacturing or when use of the tag 14 begins, the control unit 200 numbers the tag ID based on the received numbering request and records the numbered tag ID in the tag ID table 224. As a modification example, another device may number the tag ID instead of the management server 20. In the modification example, the management server 20 acquires the numbered tag ID from the device numbering the tag ID and additionally registers the acquired tag ID in the tag ID table 224.

Attribute information correlated with the tag ID in the tag ID table 224 is registered or updated as follows. When the management server 20 receives the tag ID or a reading history of the tag IDs from the information processing terminal 10, the control unit 200 first confirms whether the reading time of the tag ID included in the received information is later than a recording time of the record corresponding to the tag ID in the tag ID table 224. When the reading time is later than the recording time of the record, the control unit 200 updates the content of the record corresponding to the tag ID using the attribute information regarding the location 2242, the affixed object 2244, the color 2246, or the like included in the received information.

—Link Information Table 226—

The link information table 226 is a table in which a correspondence relation between the tag ID and the link information is recorded. FIG. 20 is an explanatory diagram illustrating an example of the configuration of the link information table 226. In the link information table 226, as illustrated in FIG. 20, for example, link information 2260, tag ID 2262, type 2264, category 2266, and title 2268 are correlated and recorded. Here, in the link information 2260, link information such as a URL or a path correlated with the tag ID is recorded. In the type 2264, for example, types of link information such as a web page or an application are recorded. In the category 2266, categories corresponding to the link information are recorded. In the title 2268, titles of the link destinations indicated by the link information are recorded. For example, data shown in the first record in FIG. 20 indicates that the link information is "www.AAA.co.jp," the tag ID of the tag 14 correlated with the link information is "1001," the type of link information is "web," the category of the link information is "park," and the title of the link destination indicated by the link information is "Japan Park Society."

The record is registered in or deleted from the link information table 226, for example, as follows. First, when the administrator or the like of the tag 14 requests that new link information be correlated with the issued tag ID, the control unit 200 confirms whether the attribute information corresponding to the link information included in the received registration request, such as the type 2264, the category 2266, and the title 2268 described above, is registered in any of the records of the link information table 226. When the attribute information is not registered in the link information table 226, the control unit 200 confirms the attribute information to the link destination indicated by the link information. When the attribute information is acquired from the link destination, the control unit 200 correlates the acquired attribute information with a combination of the tag ID and the link information included in the received registration request and additionally registers the attribute information in the link information table 226. Conversely, when the attribute information is registered in any of the records of the link information table 226, the control unit 200 extracts the attribute information registered in the link information table 226, correlates the extracted attribute information with a combination of the tag ID and the link information included in the received registration request, and additionally registers the attribute information in the link information table 226.

When the administrator or the like of the tag 14 requests that the combination of the tag ID and the link information registered in the link information table 226 be deleted, the control unit 200 deletes the record including the combination of the tag ID and the link information included in the received deletion request.

—History Table 228—

Figure 21:
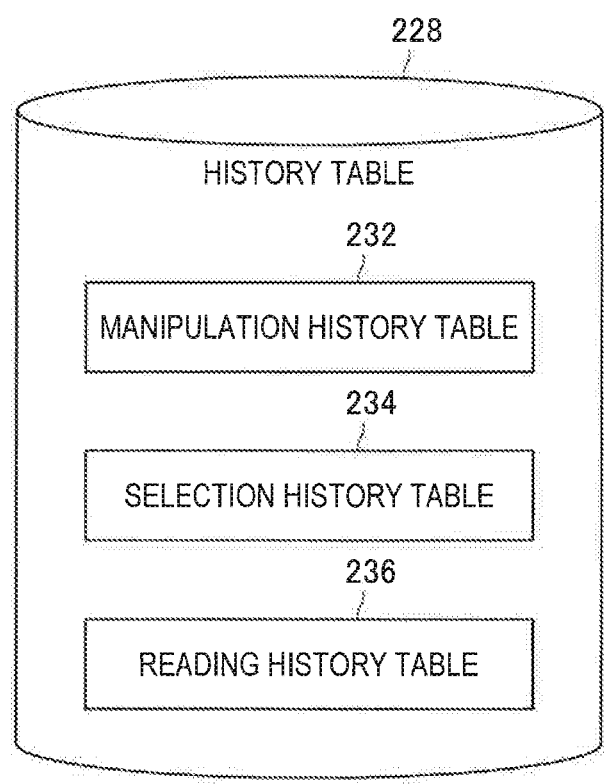
FIG. 21 is an explanatory diagram illustrating an example of the configuration of a history table according to the embodiment.

The history table 228 is a table in which the history information received from the information processing terminal 10 is recorded. FIG. 21 is an explanatory diagram illustrating an example of the configuration of the history table 228. As illustrated in FIG. 21, the history table 228 includes, for example, the manipulation history table 232, the selection history table 234, and the reading history table 236.

—Manipulation History Table 232—

The manipulation history table 232 is a table in which a history of manipulations of the user on the information processing terminal 10 is recorded. FIG. 22 is an explanatory diagram illustrating an example of the configuration of the manipulation history table 232. In the manipulation history table 232, as illustrated in FIG. 22, for example, user ID 2320, manipulation time 2322, link image 2324, and manipulation content 2326 are correlated and recorded. Here, in the user ID 2320, user IDs correlated with users and registered in advance are recorded. In the manipulation time 2322, a time at which the user manipulates the information processing terminal 10 is recorded. In the link image 2324, the title of the link image manipulated by the user is recorded. In the manipulation content 2326, content manipulated on the link image by the user is recorded. For example, data shown in the first record in FIG. 22 indicates that a user with a user ID "2001" performs "a manipulation of changing the arrangement position (display position) from 4th to 2nd" in regard to a link image with a title "Yokohama City bus" at "1300 on 7/1."

The manipulation history table 232 is updated, for example, when the control unit 200 additionally registers a record based on the manipulation history acquired from the information processing terminal 10.

—Selection History Table 234—

The selection history table 234 is a table in which a history of selection of the link information by the user is recorded. FIG. 23 is an explanatory diagram illustrating an example of the configuration of the selection history table 234. In the selection history table 234, as illustrated in FIG. 23, for example, user ID 2340, selection time 2342, and link information 2344 are correlated and recorded. Here, in the user ID 2340, user IDs of target users are recorded. In the selection time 2342, times at which the users select the link information are recorded. In the link information 2344, the link information selected by the users is recorded. For example, data shown in the first record in FIG. 23 indicates that a user with a user ID "2001" selects link information "www.AAA.com" at "10:00 on 7/11."

The selection history table 234 is updated, for example, when the control unit 200 additionally registers a record based on the selection history acquired from the information processing terminal 10.

—Reading History Table 236—

The reading history table 236 is a table in which a reading history of tag IDs by the user is recorded. FIG. 24 is an explanatory diagram illustrating an example of the configuration of the reading history table 236. In the reading history table 236, as illustrated in FIG. 24, for example, user ID 2360, reading time 2362, and tag ID 2364 are correlated and recorded. Here, in the user ID 2360, user IDs of target users are recorded. In the reading time 2362, times at which the users read the tag IDs are recorded. In the tag II) 2364, the tag IDs read by the users are recorded. For example, data shown in the first record in FIG. 24 indicates that the user with the user ID "2001" reads the tag 14 with a tag ID "1001" at "11:30 on 8/1."

The reading history of the tag 14 by each user is managed centrally in the reading history table 236. Therefore, for example, the management server 20 can comprehend or analyze a reading tendency of the tags 14 of all the users or individual user classes according to the attributes of the tags 14. For example, the management server 20 can communicate the information regarding the tags 14 read a greater number of times by all the users with the individual users and recommend the information. For example, the individual users can see a reading trend of the tags 14, such as the tags 14 read the greatest number of times by the different users.

The reading history table 236 is updated, for example, when the control unit 200 additionally registers a record based on the reading history acquired from the information processing terminal 10.

—Evaluation Value Table 230—

The evaluation value table 230 is a table in which evaluation values of the users in regard to the link destinations indicated by the link information are recorded. FIG. 25 is an explanatory diagram illustrating an example of the configuration of the evaluation value table 230. In the evaluation value table 230, as illustrated in FIG. 25, for example, link information 2300, user ID 2302, and evaluation value 2304 are correlated and recorded. Here, in the link information 2300, target link information is recorded. In the user ID 2302, user IDs of the users evaluating the link destinations indicated by the link information are recorded. In the evaluation value 2304, values given by the users evaluating the link destinations are recorded. For example, data shown in the first record in FIG. 25 indicates that a user with a user ID "0001" gives a value "+1" when evaluating a link destination indicated by the link information "www.AAA.com."

The evaluation values of the link information by the users are managed centrally in the evaluation value table 230. Therefore, the management server 20 can calculate a preference of each user for each piece of link information or popularity among all the users by referring to the evaluation value table 230.

The evaluation value table 230 is updated, for example, as follows. The control unit 200 additionally registers a record based on the evaluation value of each piece of link information acquired from the information processing terminal 10. The control unit 200 may update the evaluation value of each user such that the link information selected a greater number of times has a higher value with reference to the selection history table 234 at each predetermined timing. The control unit 200 may determine the evaluation value of each user based on an increase or decrease in the number of selections during each predetermined period with reference to the selection history table 234 at each predetermined timing and update the values recorded in the evaluation value table 230.

According to the first embodiment, a computer program can also be supplied so that the hardware such as the CPU 250, the ROM 252, and the RAM 254 included in the management server 20 has the same functions as the configurations of the above-described management server 20. A storage medium storing the computer program is also supplied.

The configuration of the management server 20 according to the first embodiment is not limited to the above-described configuration. For example, one or more of the communication unit 220 and the storage unit 222 may not be included in the management server 20, but may be included in other devices.

3-1-2. Operation According to First Embodiment

Figure 26:
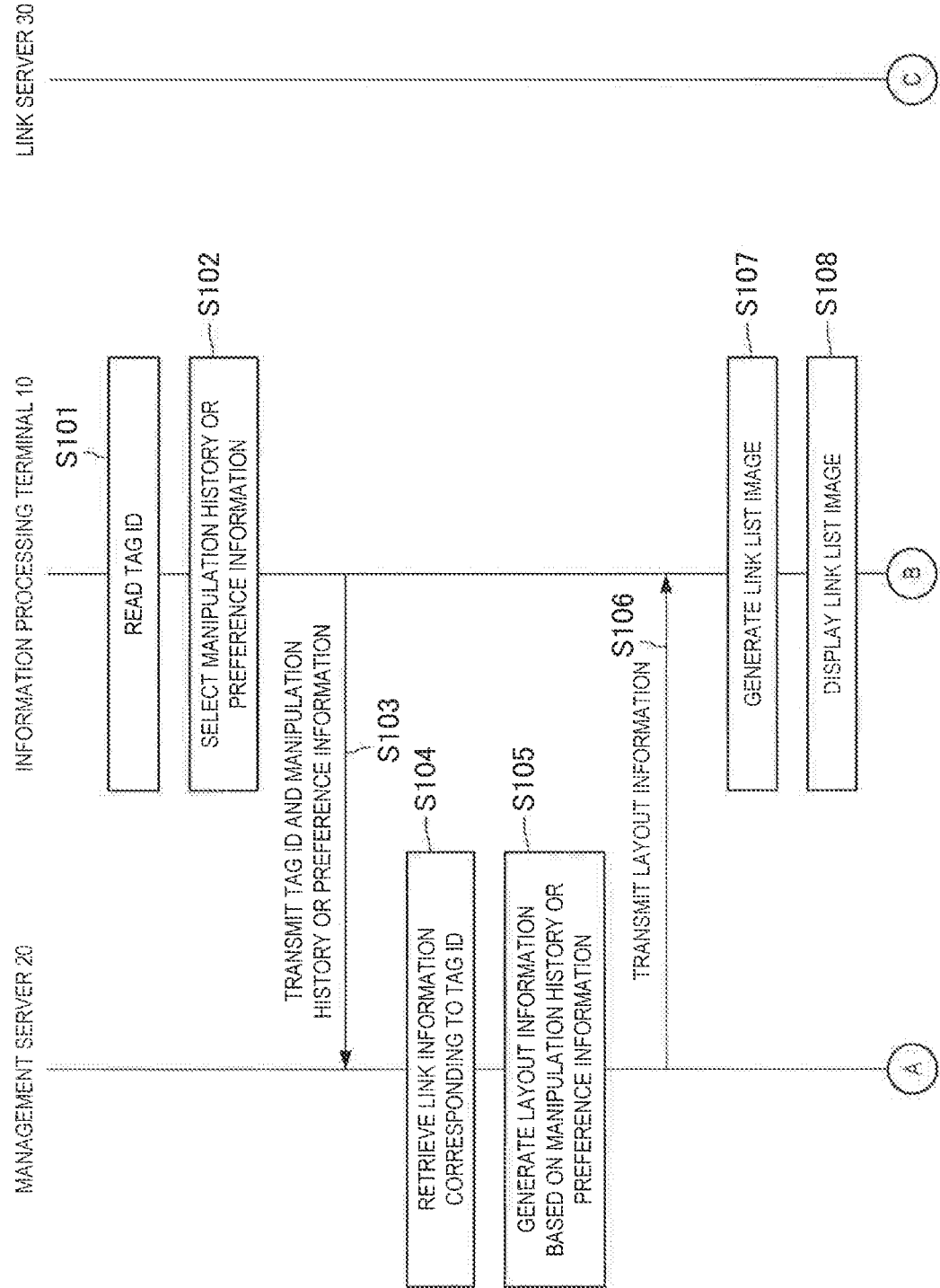
FIG. 26 is a sequence diagram illustrating a part of an operation according to the embodiment.

The configurations according to the first embodiment have been described above. Next, an operation according to the first embodiment will be described. FIG. 26 is a sequence diagram illustrating a part of the operation according to the first embodiment.

As illustrated in FIG. 26, the tag reading unit 126 of the information processing terminal 10 first reads the tag ID from the tag 14 based on a user manipulation (S101). Next, the user of the information processing terminal 10 selects the manipulation history or the preference information desired to be transmitted on the display screen when the user desires to transmit the manipulation history of the information processing terminal 10 or the preference information of the user to the management server 20 (S102). The operation of S102 may also be omitted.

Subsequently, the request unit 102 causes the communication unit 120 to transmit the tag ID read in S101 and the manipulation history or the preference information selected in S102 to the management server 20, and then requests the management server 20 to supply the layout information corresponding to the tag ID (S103).

Thereafter, the link information acquisition unit 202 of the management server 20 acquires the plurality of pieces of link information correlated with the tag ID received from the information processing terminal 10, for example, by referring to the recording content of the link information table 226 (S104). Subsequently, the layout information generation unit 204 generates the layout information including the plurality of pieces of link information acquired in S104 based on, for example, the manipulation history or the preference information of the user received from the information processing terminal 10 (S105). Subsequently, the transmission control unit 206 causes the communication unit 220 to transmit the layout information generated in S105 to the information processing terminal 10 (S106).

Thereafter, the display control unit 104 of the information processing terminal 10 generates the link list image based on the layout information received from the management server 20 (S107) and displays the generated link list image on the display screen (S108).

Figure 27:
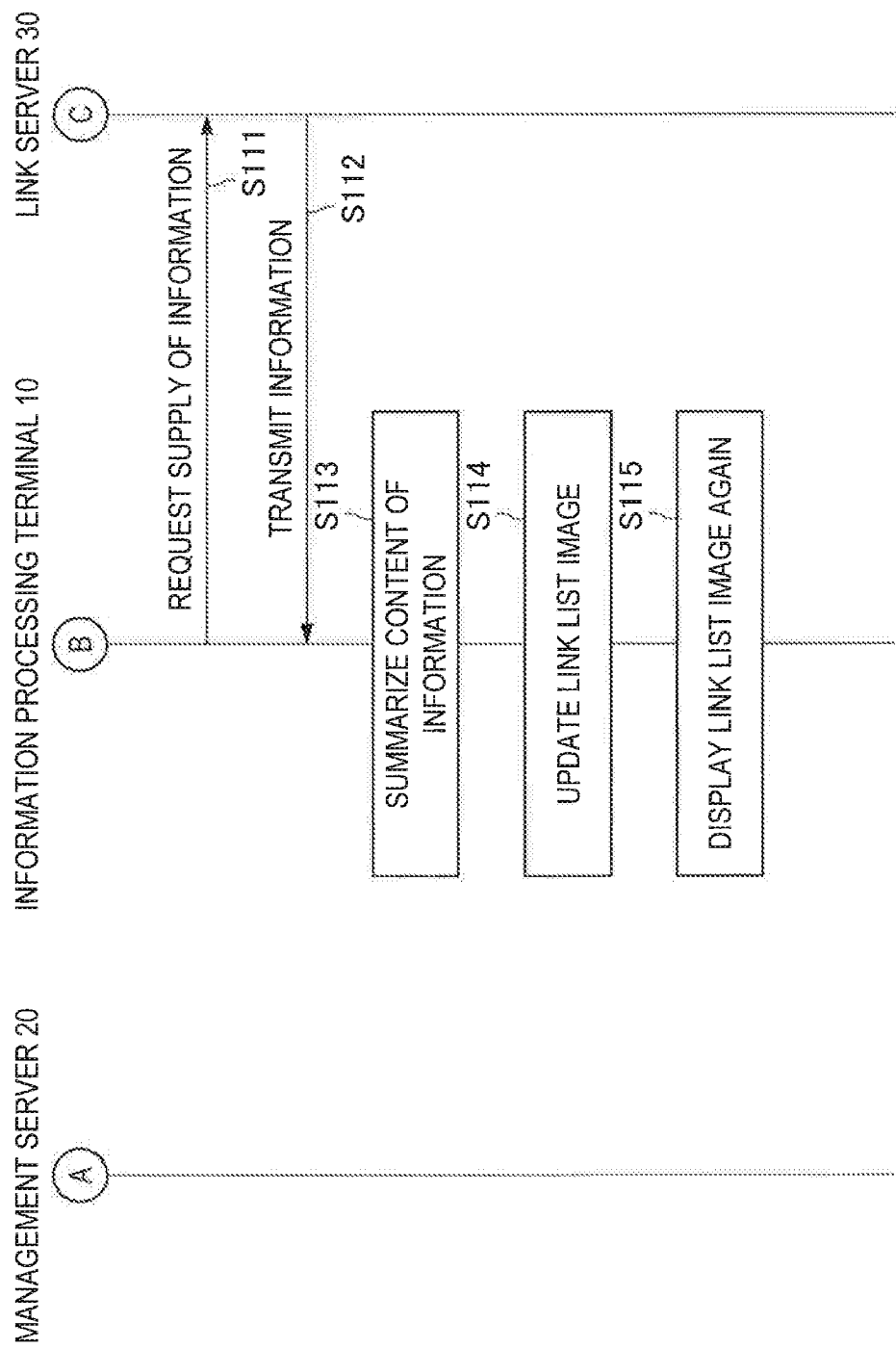
FIG. 27 is a sequence diagram illustrating a part of the operation according to the embodiment.

Next, an operation subsequent to S108 will be described with reference to FIG. 27. FIG. 27 is a sequence diagram illustrating the operation subsequent to S108. As illustrated in FIG. 27, after S108, the display control unit 104 of the information processing terminal 10 causes the communication unit 120 to transmit a message for requesting the link destination corresponding to each of the plurality of pieces of link information included in the layout information to supply information (S111).

Subsequently, the link server 30 transmits the corresponding information to the information processing terminal 10 based on the request message received from the information processing terminal 10 (S112).

Subsequently, the information summarization unit 106 of the information processing terminal 10 summarizes the content of the information acquired from the link destination based on the attribute such as the resolution of the display or the like (S113). The operation of S113 may be omitted.

Subsequently, the display control unit 104 updates the display form of the link list image based on the information acquired from the link server 30 or a result of the summarization in S113 (S114). Then, the display control unit 104 displays the updated link list image on the display screen (S115).

3-1-3. Advantageous Effects According to First Embodiment

As described above with reference to, for example, FIGS. 6, 26, and 27, the information processing terminal 10 according to the first embodiment requests the management server 20 to supply the layout information including the plurality of pieces of link information correlated with the tag ID based on the acquisition of the tag ID from the tag 14. Then, the information processing terminal 10 generates the link list image based on the layout information received from the management server 20 and displays the generated link list image on the display screen. Then, the information processing terminal 10 acquires the information from the link destination corresponding to each of the plurality of pieces of link information included in the layout information and controls the display form of the link list image displayed on the display screen based on the acquired information. Therefore, the information processing terminal 10 can supply the user with information useful for selecting the link information.

For example, the information processing terminal 10 displays the display indicating the kind of information acquired from the link destination corresponding to the link information inside the link list image or additionally displays the information acquired from the link destination in the link list image. Therefore, even when the user is not familiar with a site displayed in the link list image or does not understand a title name displayed in the link list image, the user can easily select a desired site among a plurality of sites by confirming the display form of the link image.

As described with reference to FIGS. 18, 26, and 27, the management server 20 according to the first embodiment acquires the plurality of pieces of link information correlated with the tag ID based on the reception of the tag ID from the information processing terminal 10, generates the layout information including the plurality of pieces of acquired link information, and transmits the generated layout information to the information processing terminal 10. Therefore, the management server 20 can present the plurality of pieces of link information correlated with the tag ID to the user of the information processing terminal 10 for high convenience.

For example, the management server 20 decides the display priority of the plurality of pieces of link information in the link list image based on the selection history of the user link information, the reading history of the tag IDs, the evaluation value of each link destination by the plurality of users, or the like. For example, the management server 20 generates the layout information designating the display order or the degree of display emphasis of the plurality of pieces of link information based on the decided priority. Therefore, the user of the information processing terminal 10 can easily find the link information that he or she finds more interesting, the link information with higher popularity among all the users, or the like among the plurality of pieces of link information listed and displayed in the link list image. Accordingly, the user can more easily select the desired link information.

3-2. Second Embodiment

The first embodiment has been described above. In the first embodiment, as described above, the information processing terminal 10 requests the management server 20 to supply the layout information when the tag ID is read. In a second embodiment, as will be described below, the information processing terminal 10 transmits a tag II) selected by a user from a history of previously read tag IDs to the management server 20 and requests the management server 20 to supply layout information regarding recent content when the information processing terminal 10 transmits the tag ID.

3-2-1. Configuration (3-2-1-1. Information Processing Terminal 10)

First, the configuration of the information processing terminal 10 according to the second embodiment will be described. The functional block diagram of the information processing terminal 10 according to the second embodiment is the same as illustrated in FIG. 6 in the first embodiment.
—Request Unit 102—

For example, the request unit 102 according to the second embodiment requests the management server 20 to newly supply the layout information including the plurality of pieces of link information correlated with the tag ID in regard to the tag ID selected by the user in the history of the previously read tag IDs.
—Display Control Unit 104—

The display control unit 104 according to the second embodiment can display a tag ID selection image on the display screen for the user to select one of the previously read tag IDs. As examples of the tag ID selection image, for example, the following 8 kinds of images can be exemplified.

Image Example 1

For example, the tag ID selection image may be an image in which times at which the tag IDs were read previously are displayed. The user can select the tag ID corresponding to the selected time in the tag ID selection image by selecting one of the displayed times.

Image Example 2

Figure 28:
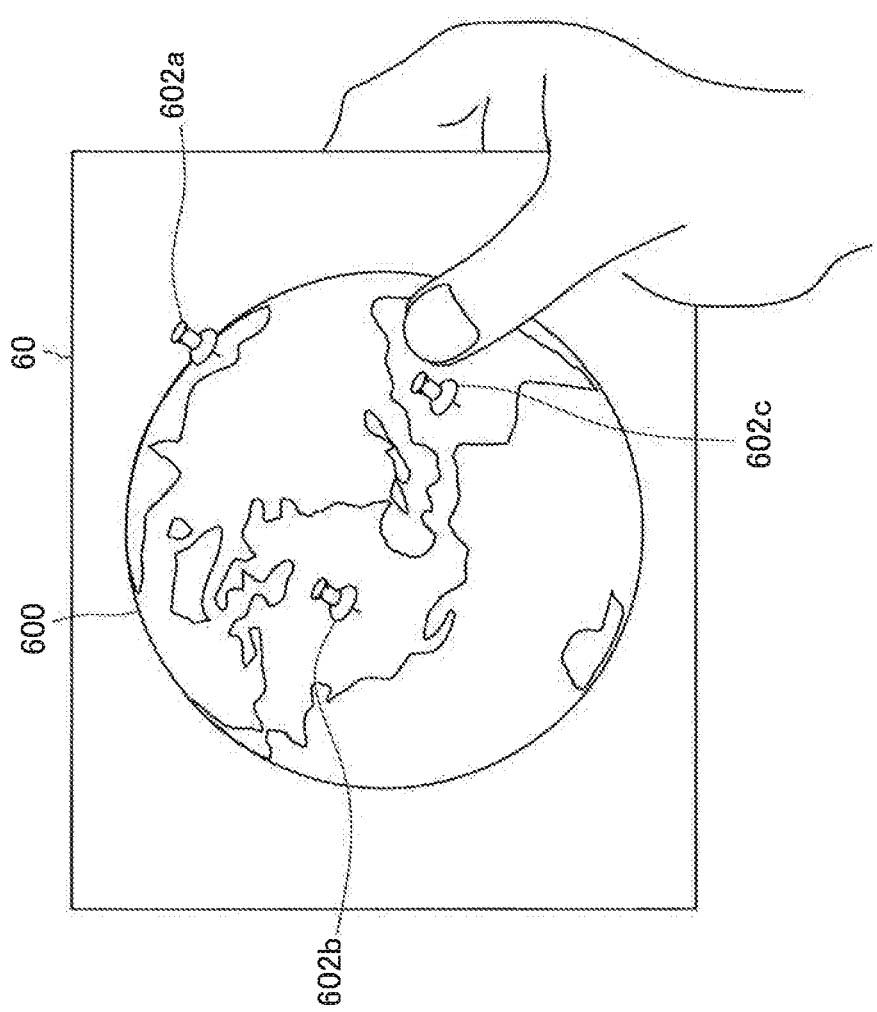
FIG. 28 is an explanatory diagram illustrating an example of configuration of a tag IL) selection image according to a second embodiment.

The tag ID selection image may be, for example, an image in which locations 602 at which the tag IDs were read previously are displayed, as illustrated in FIG. 28. NG. 28 is an explanatory diagram illustrating an example of the configuration of a tag ID selection image (tag ID selection image 60) in image example 2. As illustrated in FIG. 28, the user can select the tag ID corresponding to the selected location 602 in the tag ID selection image 60 by selecting one of the displayed locations 602.

Image Example 3

The tag ID selection image may be an image in which reading histories of the tag IDs are classified according to categories or keywords correlated with the tag IDs. The user can select the tag ID corresponding to the selected category or keyword in the tag ID selection image by selecting the displayed category or keyword.

Image Example 4

The tag ID selection image may be an image in which the number of uses of the previously read tag Ms is displayed. Here, the number of uses may be the number of uses of the tag Ms by the user of the target information processing terminal 10 or may be the number of uses of the tag ID by all the users of the information processing terminal 10. For example, the user can select the tag ID in the tag ID selection image by referring to the displayed number of uses, for example, by selecting the tag IDs with greater numbers of uses.

Image Example 5

The tag ID selection image may be an image in which the reading histories of the tag IDs are classified based on, for example, the evaluation values of the tag Ms set by the user. For example, the user can easily find and select the tag ID with the high evaluation value in the tag ID selection image.

Image Example 6

The tag ID selection image may be an image in which a distance between a location at which the previously read tag ID was read and a current position is displayed. The user can select the tag ID in the tag ID selection image by referring to a perspective of the displayed distance, for example, by selecting the tag ID read at a location close to the current position.

Image Example 7

The tag ID selection image may be an image which shows the tag ID that the user is encouraged to select among the previously read tag IDs based on, for example, recommendation information or the like received from the management server 20. The user can easily select, for example, the tag ID that he or she is encouraged to select by the management server 20 or the information processing terminal 10 in the tag ID selection image.

Image Example 8

The tag ID selection image may be an image in which the previously read tag IDs are arranged in a random order. For example, when the number of particularly previously read tag IDs is very large in the tag ID selection image, the user can select the tag ID at random, and thus it is possible to reduce the time and effort of selection. It is possible to prevent the user from selecting only a specific tag ID.

As a modification example, the display control unit 104 can also generate two or more kinds of tag ID selection images among the foregoing 8 kinds of tag ID selection images as the tag ID selection images, for example, two or more kinds of tag ID selection images simultaneously included in accordance with a tab style or the like or configured hierarchically.

The functions of the other constituent elements are the same as those of the first embodiment.

(3-2-1-2. Management Server 20)

The configuration of the management server 20 according to the second embodiment is the same as that of the first embodiment. Accordingly, the description of the configuration will be omitted here.

3-2-2. Operation According to Second Embodiment

The configurations according to the second embodiment have been described above. Next, an operation according to the second embodiment will be described. Flea. 29 is a sequence diagram illustrating a part of the operation according to the second embodiment.

Figure 29:
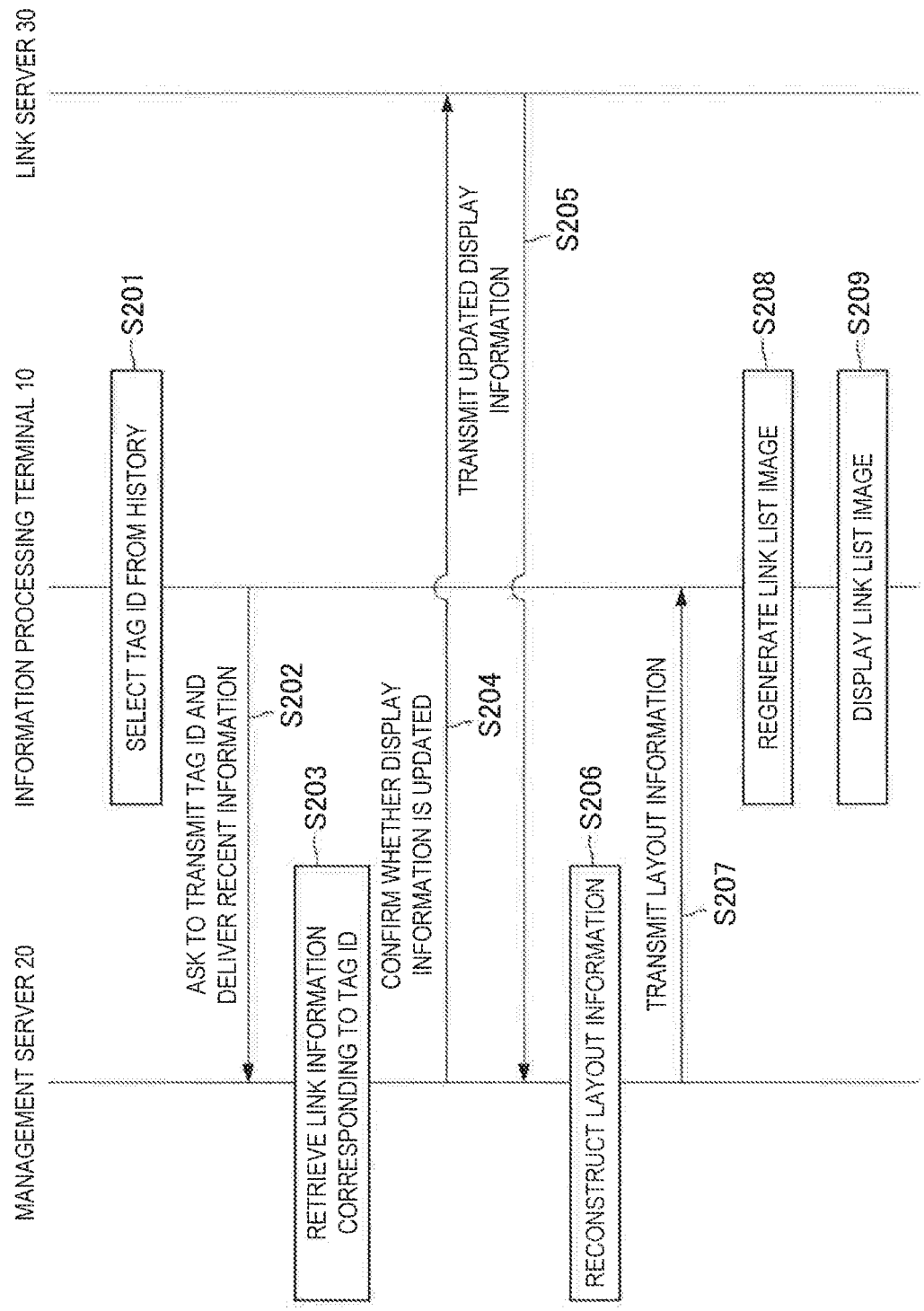
FIG. 29 is a sequence diagram illustrating a part of an operation according to the embodiment.

As illustrated in FIG. 29, the display control unit 104 of the information processing terminal 10 first displays the tag ID selection image on the display screen. The user selects one of the previously read tag IDs in the tag ID selection image and inputs the tag ID with the input unit 124 (S201).

Subsequently, the request unit 102 causes the communication unit 120 to transmit a message for requesting the management server 20 to supply the recent layout information corresponding to the tag ID to the management server 20 along with the tag ID selected in S201 (S202).

Thereafter, the link information acquisition unit 202 of the management server 20 acquires the plurality of pieces of link information correlated with the tag ID received from the information processing terminal 10, for example, by referring to the recording content of the link information table 226 (S203). Subsequently, the layout information generation unit 204 causes the communication unit 220 to transmit, for example, an inquiry of whether to update the information displayed in the link list image, such as the title of the link destination or a background image of the link image, to the link destination indicated by each of the plurality of pieces of link information acquired in S203 (S204).

Thereafter, each link server 30 transmits the updated information to the management server 20 when content of the information displayed in the link list image is changed from a time at which the tag ID is read (S205). When the content of the displayed information is not changed, the link server 30 may omit the operation of S205 or may transmit a message indicating that the changed information is not present to the management server 20.

Thereafter, the layout information generation unit 204 reconstructs the layout information based on the information received in S205 (S206). Subsequently, the transmission control unit 206 causes the communication unit 220 to transmit the layout information reconstructed in S206 to the information processing terminal 10 (S207).

Thereafter, the display control unit 104 of the information processing terminal 10 regenerates the link list image based on the layout information received from the management server 20 (S208) and displays the generated link list image on the display screen (S209).

The operations subsequent to S209 are the same as the operations of S111 to S115 in the first embodiment.

3-2-3. Advantageous Effects According to Second Embodiment

As described above with reference to, for example, FIG. 29, the information processing terminal 10 according to the second embodiment displays the tag ID selection image which shows the previously read tag IDs on the display screen. The information processing terminal 10 transmits the tag ID selected by the user in the tag ID selection image to the management server 20 and requests the management server 20 to supply the updated layout information. The information processing terminal 10 regenerates the link list image based on the updated layout information acquired from the management server 20 and displays the generated link list image on the display screen.

Therefore, the user can view the link list image of the display information, for example, a character string such as the title of the link destination or an image such as a custom icon or a state icon, in its most recent state, in regard to the plurality of pieces of link information correlated with the previously read tag ID.

The user can browse the updated link list image corresponding to the selected tag ID merely selecting the tag ID in the tag ID selection image or the history corresponding to the tag ID, and thus convenience is high.

3. Modification Examples

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the information processing system according to an embodiment of the present disclosure is not limited to the configuration illustrated in FIG. 1, but can also be applied to a configuration illustrated in FIG. 30 as a modification example. FIG. 30 is an explanatory diagram illustrating a basic configuration of the information processing system according to a modification example of the present disclosure. As illustrated in FIG. 30, the information processing system according to the modification example of the present disclosure newly includes a summarization and generation server 32 compared to FIG. 1.

The summarization and generation server 32 has a summarization function of appropriately displaying information received by the information processing terminal 10 from the link server 30 in the information processing terminal 10 in response to a request from the information processing terminal 10. For example, as illustrated in FIG. 16, the summarization and generation server 32 omits a part of a character string received by the information processing terminal 10 from the link server 30 or changes a font size of the character string. The summarization and generation server 32 generates a thumbnail of an image received by the information processing terminal 10 from the link server 30. The summarization and generation server 32 can also execute a program such as an animation or the like received by the information processing terminal 10 from the link server 30 instead of the information processing terminal 10 and transmit data such as an image of an execution result to the information processing terminal 10. When the modification example is applied, the information processing terminal 10 may not include the information summarization unit 106.

Additionally, the present technology may also be configured as below.

(1)

An information processing terminal including:

a request unit configured to request an information processing device to supply layout information including a plurality of pieces of link information indicating link destinations and correlated with information regarding an object based on acquisition of the information regarding the object from the object; an.

a display control unit configured to generate a link list image based on the layout information acquired from the information processing device and display the generated link list image on a display screen, wherein the display control unit acquires information from a link destination corresponding to each of the plurality of pieces of link information included in the layout information and controls a display form of the link list image displayed on the display screen based on the acquired information.

(2)
The information processing terminal according to (1),
wherein the display control unit disposes a link image correlated with each of the plurality of pieces of link information inside the link list image in accordance with a layout indicated by the layout information, and
wherein the display control unit changes a display form of the link image corresponding to the link destination of an acquisition source according to an acquisition situation of the information from the link destination.

(3)
The information processing terminal according to (1) or (2),
wherein the display control unit further displays content of the information acquired from the link destination on the display screen.

(4)
The information processing terminal according to (3),
wherein the display control unit displays the content of the information acquired from the link destination in association with a link image corresponding to the link destination of an acquisition source.

(5)
The information processing terminal according to (3) or (4),
wherein, when any link image is selected on the display screen by a user, the display control unit displays the content of the information acquired from the link destination corresponding to the selected link image on the display screen.

(6)
The information processing terminal according to any one of (1) to (5),
wherein the display control unit does not dispose, inside the link list image, a link image corresponding to the link information satisfying a display rejection condition decided based on a manipulation of a user of the information processing terminal among the plurality of pieces of link information included in the layout information.

(7)
The information processing terminal according to any one of (1) to (6),
wherein the display control unit changes a display form of a link image corresponding to the link destination of the acquisition source according to a kind of the information acquired from the link destination.

(8)
The information processing terminal according to any one of (1) to (7),
wherein the display control unit displays the link list image on the display screen in a display order of the plurality of pieces of link information indicated by the layout information.

(9)
The information processing terminal according to any one of (1) to (8),
wherein the display control unit changes a method of displaying the information acquired from the link destination based on an attribute of a display displaying the display screen.

(10)
The information processing terminal according to (9),
wherein the attribute of the display includes a resolution of the display, and
wherein the display control unit changes an amount of information displayed on the display screen in regard to the information acquired from the link destination based on the resolution of the display.

(11)
The information processing terminal according to any one of (1) to (8),
wherein the display control unit changes a method of displaying the information acquired from the link destination based on a display direction of the display screen.

(12)
The information processing terminal according to any one of (1) to (8),
wherein the display control unit changes a method of displaying the information acquired from the link destination based on a display setting designated by a user.

(13)
The information processing terminal according to any one of (1) to (12), further including:
an information summarization unit configured to summarize content of the information acquired from the link destination,
wherein the display control unit displays the content of the information summarized by the information summarization unit on the display screen instead of the information acquired from the link destination.

(14)
The information processing terminal according to any one of (1) to (13), further including;
a transmission control unit configured to transmit information indicating a manipulation history of a user on the display screen to the information processing device.

(15)
The information processing terminal according to (14), further including:
an information acquisition unit configured to read information regarding an object from the object,
wherein the transmission control unit further transmits information indicating a reading history by the information acquisition unit to the information processing device.

(16)
An information processing method including:
requesting an information processing device to supply layout information including a plurality of pieces of link information indicating link destinations and correlated with information regarding an object based on acquisition of the information regarding the object from the object;
generating, by a processor, a link list image based on the layout information acquired from the information processing device and displaying the generated link list image on a display screen; and
acquiring information from a link destination corresponding to each of the plurality of pieces of link information included in the layout information and controlling a display form of the link list image displayed on the display screen based on the acquired information.

(17)
An information processing terminal including:
an information acquisition unit configured to acquire information regarding an object from the object;
a communication unit configured to communicate with an external device; and
a control unit,
wherein the control unit
requests, via the communication unit, an information processing device to supply layout information including a plurality of pieces of link information indicating link destinations and correlated with the information regarding the object acquired by the information acquisition unit, generates a link list image based on the layout information acquired from the information processing device and displays the generated link list image on a display screen, and acquires information from a link destination corresponding to each of the plurality of pieces of link information included in the layout information via the communication unit and controls a display form of the link list image displayed on the display screen based on the acquired information.

(18)

An information processing method including:

acquiring information regarding an object from the object;

requesting an information processing device to supply layout information including a plurality of pieces of link information indicating link destinations and correlated with the acquired information regarding the object;

generating, by a processor, a link list image based on the layout information acquired from the information processing device and displaying the generated link list image on a display screen; and acquiring information from a link destination corresponding to each of the plurality of pieces of link information included in the layout information and controlling a display form of the link list image displayed on the display screen based on the acquired information.

(19)

A program causing a computer to perform:

acquiring information regarding an object from the object;

requesting an information processing device to supply layout information including a plurality of pieces of link information indicating link destinations and correlated with the acquired information regarding the object;

generating, by a processor, a link list image based on the layout information acquired from the information processing device and displaying the generated link list image on a display screen; and acquiring information from a link destination corresponding to each of the plurality of pieces of link information included in the layout information and controlling a display form of the link list image displayed on the display screen based on the acquired information.

(20)

A computer-readable recording medium that records a program causing a computer to perform:

acquiring information regarding an object from the object;

requesting an information processing device to supply layout information including a plurality of pieces of link information indicating link destinations and correlated with the acquired information regarding the object;

generating, by a processor, a link list image based on the layout information acquired from the information processing device and displaying the generated link list image on a display screen; and acquiring information from a link destination corresponding to each of the plurality of pieces of link information included in the layout information and controlling a display form of the link list image displayed on the display screen based on the acquired information.

REFERENCE SIGNS LIST 10 information processing terminal
12 communication network
14 tag
20 management server
30 link server
32 summarization and generation server
100 control unit
102 request unit
104 display control unit
106 information summarization unit
108 transmission control unit
120 communication unit
122 display unit
124 input unit
126 tag reading unit
128 storage unit
150 CPU
152 ROM
154 RAM
156 recording medium
158 input and output interface
160 manipulation input device
162 display device
164 communication interface
164 this communication interface
166 IC chip
168 communication antenna.
170 camera
172 bus
200 control unit
202 link information acquisition unit
204 layout information generation unit
206 transmission control unit
208 priority decision unit
220 communication unit
222 storage unit
224 tag ID table
226 link information table
28 history table
230 evaluation value table
232 manipulation history table
234 selection history table
236 reading history table
250 CPU
252 ROM
254 RAM
256 communication interface
258 recording medium
260 bus

The invention claimed is:

1. An information processing terminal comprising:
circuitry configured to:
request an information processing device to supply layout information including a plurality of pieces of link information indicating link destinations and correlated with information regarding an object, based on acquisition of the information regarding the object from the object;
generate a link list image comprising a plurality of link images corresponding to the plurality of pieces of link information and having a display form, based on the layout information acquired from the information processing device;
control display of the generated link list image comprising the plurality of link images having the display form by a display screen;
acquire information from link destinations corresponding to the plurality of pieces of link information included in the layout information;
change the display form of the plurality of link images displayed by the display screen to an updated display form, based on the information acquired from respective link destinations corresponding to the plurality of pieces of link information;

control display of the generated link list image comprising the plurality of link images having the updated display form by the display screen;

dispose a link image correlated with each link information of the plurality of pieces of link information inside the link list image in accordance with a layout indicated by the layout information;

change a display form of the link image corresponding to the link destination of an acquisition source according to an acquisition situation of the information from the link destination; and change the display form of the link images corresponding to the link destination of the acquisition source according to a kind of the information acquired from the link destination.

2. The information processing terminal according to claim 1, wherein the circuitry is further configured to:
control display of content of the information acquired from the link destination by the display screen.

3. The information processing terminal according to claim 2, wherein the circuitry is further configured to:
control display of the content of the information acquired from the link destination in association with a link image corresponding to the link destination of an acquisition source by the display screen.

4. The information processing terminal according to claim 2, wherein, when any link image is selected on the display screen by a user, the circuitry is further configured to:
control display of the content of the information acquired from the link destination corresponding to the selected link image by the display screen.

5. The information processing terminal according to claim 1, wherein the circuitry is further configured to:
control display of the link list image to not dispose, inside the link list image, a link image corresponding to link information of the plurality of pieces of link information satisfying a display rejection condition decided based on a manipulation of a user of the information processing terminal among the plurality of pieces of link information included in the layout information.

6. The information processing terminal according to claim 1, wherein the circuitry is further configured to:
control display of the link list image by the display screen in a display order of the plurality of pieces of link information indicated by the layout information.

7. The information processing terminal according to claim 1, wherein the circuitry is further configured to:
change a method of displaying the information acquired from the link destination based on an attribute of a display displaying the display screen.

8. The information processing terminal according to claim 7, wherein the attribute of the display includes a resolution of the display, and
wherein the circuitry is further configured to:
change an amount of information displayed by the display screen in regard to the information acquired from the link destination based on the resolution of the display.

9. The information processing terminal according to claim 1, wherein the circuitry is further configured to:
change a method of displaying the information acquired from the link destination based on a display direction of the display screen.

10. The information processing terminal according to claim 1, wherein the circuitry is further configured to:
change a method of displaying the information acquired from the link destination based on a display setting designated by a user.

11. The information processing terminal according to claim 1, wherein the circuitry is further configured to:
summarize content of the information acquired from the link destination; and
control display of the content of the summarized information by the display screen instead of the information acquired from the link destination.

12. The information processing terminal according to claim 1, wherein the circuitry is further configured to:
transmit information indicating a manipulation history of a user on the display screen to the information processing device.

13. The information processing terminal according to claim 12, wherein the circuitry is further configured to:
read information regarding an object from the object; and
transmit information indicating a reading history of the information to the information processing device.

14. The information processing terminal according to claim 1, wherein the display form includes at least one of shape, design, background color, or color of the link images.

15. An information processing method comprising:
requesting an information processing device to supply layout information including a plurality of pieces of link information indicating link destinations and correlated with information regarding an object, based on acquisition of the information regarding the object from the object;

generating, by a processor, a link list image comprising a plurality of link images corresponding to the plurality of pieces of link information and having a display form, based on the layout information acquired from the information processing device;

displaying the generated link list image having the display form by a display screen;

acquiring information from link destinations corresponding to the plurality of pieces of link information included in the layout information;

changing the display form of the plurality of link images displayed by the display screen to an updated display form, based on the information acquired from respective link destinations corresponding to the plurality of pieces of link information;

displaying the generated link list image comprising the plurality of link images having the updated display form by the display screen;

disposing a link image correlated with each link information of the plurality of pieces of link information inside the link list image in accordance with a layout indicated by the layout information;

changing a display form of the link image corresponding to the link destination of an acquisition source according to an acquisition situation of the information from the link destination; and changing the display form of the link images corresponding to the link destination of the acquisition source according to a kind of the information acquired from the link destination.

16. An information processing terminal comprising:
circuitry configured to:
acquire information regarding an object from the object;

communicate with an external device;

request an information processing device to supply layout information including a plurality of pieces of link information indicating link destinations and correlated with the information regarding the object;

generate a link list image comprising a plurality of link images corresponding to the plurality of pieces of link information and having a display form, based on the layout information acquired from the information processing device;

control display of the generated link list image having the display form by a display screen;

acquire information from link destinations corresponding to the plurality of pieces of link information included in the layout information;

change the display form of the plurality of link images displayed by the display screen to an updated display form, based on the information acquired from respective link destinations corresponding to the plurality of pieces of link information;

control display of the generated link list image comprising the plurality of link images having the updated display form by the display screen;

dispose a link image correlated with each link information of the plurality of pieces of link information inside the link list image in accordance with a layout indicated by the layout information;

change a display form of the link image corresponding to the link destination of an acquisition source according to an acquisition situation of the information from the link destination; and change the display form of the link images corresponding to the link destination of the acquisition source according to a kind of the information acquired from the link destination.

17. An information processing method comprising:

acquiring information regarding an object from the object;

requesting an information processing device to supply layout information including a plurality of pieces of link information indicating link destinations and correlated with the acquired information regarding the object;

generating, by a processor, a link list image comprising a plurality of link images corresponding to the plurality of pieces of link information and having a display form, based on the layout information acquired from the information processing device;

displaying the generated link list image comprising the plurality of link images having the display form on a display screen;

acquiring information from link destinations corresponding to the plurality of pieces of link information included in the layout information;

changing the display form of the plurality of link images displayed by the display screen to an updated display form, based on the information acquired from respective link destinations corresponding to the plurality of pieces of link information;

displaying the generated link list image comprising the plurality of link images having the updated display form by the display screen;

disposing a link image correlated with each link information of the plurality of pieces of link information inside the link list image in accordance with a layout indicated by the layout information;

changing a display form of the link image corresponding to the link destination of an acquisition source according to an acquisition situation of the information from the link destination; and changing the display form of the link images corresponding to the link destination of the acquisition source according to a kind of the information acquired from the link destination.

18. A non-transitory computer-readable storage medium having embodies thereon a program, which when executed by a computer causes the computer to execute a method, the method comprising:

acquiring information regarding an object from the object;

requesting an information processing device to supply layout information including a plurality of pieces of link information indicating link destinations and correlated with the acquired information regarding the object;

generating, by a processor, a link list image comprising a plurality of link images corresponding to the plurality of pieces of link information and having a display form, based on the layout information acquired from the information processing device;

displaying the generated link list image comprising the plurality of link images having the display form on a display screen;

acquiring information from link destinations corresponding to the plurality of pieces of link information included in the layout information;

changing the display form of the plurality of link images displayed by the display screen to an updated display form, based on the information acquired from respective link destinations corresponding to the plurality of pieces of link information;

displaying the generated link list image comprising the plurality of link images having the updated display form by the display screen;

disposing a link image correlated with each link information of the plurality of pieces of link information inside the link list image in accordance with a layout indicated by the layout information;

changing a display form of the link image corresponding to the link destination of an acquisition source according to an acquisition situation of the information from the link destination; and changing the display form of the link images corresponding to the link destination of the acquisition source according to a kind of the information acquired from the link destination.

* * * * *